US011474728B2

(12) United States Patent
Gallaher et al.

(10) Patent No.: US 11,474,728 B2
(45) Date of Patent: Oct. 18, 2022

(54) DATA STORAGE VOLUME RECORD MANAGEMENT FOR APPLICATION-LEVEL RECOVERY

(71) Applicant: INTERNATIONAL BUSINESS MACHINES CORPORATION, Armonk, NY (US)

(72) Inventors: Shannon Lyn Gallaher, Tucson, AZ (US); Glenn Randle Wilcock, Tucson, AZ (US); James B. Cammarata, La Grange Park, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 66 days.

(21) Appl. No.: 17/105,350

(22) Filed: Nov. 25, 2020

(65) Prior Publication Data

US 2022/0164121 A1 May 26, 2022

(51) Int. Cl.
*G06F 3/06* (2006.01)
*G06F 11/14* (2006.01)

(52) U.S. Cl.
CPC .......... *G06F 3/0647* (2013.01); *G06F 3/0614* (2013.01); *G06F 3/0629* (2013.01);
(Continued)

(58) Field of Classification Search
CPC .... G06F 3/0605; G06F 3/0614; G06F 3/0619; G06F 3/0629; G06F 3/0632;
(Continued)

(56) References Cited

U.S. PATENT DOCUMENTS 7,080,277 B2    7/2006   Anna et al.
8,291,159 B2*   10/2012   Rajagopal ........... G06F 9/45537
                                                              718/1
(Continued)

OTHER PUBLICATIONS

U.S. Appl. No. 16/907,082, entitled Data Set Recovery From a Point-In-Time Logical Corruption Protection Copy, dated Jun. 19, 2020, 36 pp. [18.922 (Appln)].
(Continued)

*Primary Examiner* — Gary J Portka
(74) *Attorney, Agent, or Firm* — Konrad Raynes Davda & Victor LLP; William K. Konrad

(57) ABSTRACT

Provided are a computer program product, system and method for data storage volume record management for application-level recovery in accordance with the present description. In one embodiment, logical volume movement is addressed when performing enterprise application recovery. In one embodiment, a host-based recovery product in accordance with the present description, can detect logical volume movement from one physical device to another and proactively prevent application level recovery that potentially may result in data loss. In one embodiment, a time-based capturing of pairings of logical and physical volume identifiers or descriptors within storage configuration records and sub-records are used to surgically recover volumes of an application from enterprise level protection copy of physical media. This history of pairings facilitates many types of logical volume to physical media remapping, such as the regular migration of data to replacement storage controllers which can occur at various times.

21 Claims, 10 Drawing Sheets

(52) U.S. Cl.
CPC .......... *G06F 3/0644* (2013.01); *G06F 3/0665* (2013.01); *G06F 3/0683* (2013.01); *G06F 11/1446* (2013.01); *G06F 2201/84* (2013.01)

(58) Field of Classification Search
CPC .... G06F 3/0644; G06F 3/0647; G06F 3/0665; G06F 3/0683; G06F 11/1446; G06F 11/1448; G06F 11/1469; G06F 2201/84
USPC .......................................... 711/156, 162, 165
See application file for complete search history.

(56) References Cited

U.S. PATENT DOCUMENTS

| | | | |
|---|---|---|---|
| 8,424,008 B2 | 4/2013 | Wake | |
| 8,713,356 B1 | 4/2014 | Chan et al. | |
| 9,720,786 B2 | 8/2017 | Crockett | |
| 10,353,602 B2 | 7/2019 | Caporale et al. | |
| 10,558,532 B2 | 2/2020 | Crawford et al. | |
| 10,789,018 B2 * | 9/2020 | Tylik | G06F 3/0604 |
| 10,789,132 B2 | 9/2020 | McBride et al. | |
| 2014/0075110 A1 * | 3/2014 | Benhase | G06F 3/0689 |
| | | | 711/E12.017 |
| 2016/0110259 A1 | 4/2016 | Fang et al. | |
| 2018/0293136 A1 * | 10/2018 | Pomykaj | G06F 11/1469 |
| 2020/0183793 A1 | 6/2020 | Pomykaj | |
| 2020/0241753 A1 | 7/2020 | Gupta et al. | |
| 2020/0264956 A1 | 8/2020 | Thomas et al. | |

OTHER PUBLICATIONS

U.S. Appl. No. 16/684,911, entitled "Application-Level Recovery From an Enterprise-level Image Copy", dated Nov. 15, 2019, 52 pp. [P201810074US01 (Appln)].

Cores, I., et al., "Improving Scalability of Application-Level Checkpoint-Recovery by Reducing Check-Point Sizes", New Generation Computing, vol. 31, Jul. 2013, 27 pp.

Draper, D., et al., "IBM GDPS: An Introduction to Concepts and Capabilities", IBM Redbooks, May 2020, 384 pp.

IBM Corp., "Logical Subsystems", [online], [Retrieved on Oct. 30, 2020], Retrieved from the Internet at <URL: https://www.ibm.com/support/knowledgecenter/SSHGBU_9.0.0/com.ibm.storage.ssic.help.doc/ds8_Iss_uui74.html>, 3 pp.

IBM Corp., "Primary and Secondary Parameter: Identify Control Unit", [online], [Retrieved on Oct. 30, 2020], Retrieved from the Internet at <URL: https://www.ibm.com/support/knowledgecenter/en/SSLTBW_2.1.0/com.ibm.zos.v2r1.ickug00/ick40378.htm>, 3 pp.

Liu, X., et al., "ELVM: A LVM-Based Remote Replication System", 2009 International Forum on Computer Science-Technology and Applications, Dec. 25-27, 2009, 5 pp.

Liu, X., et al., "SnapCDP: A CDP System Based on LVM", ICA3PP 2009, LNCS 5574, Jun. 2009, 11 pp.

Navarro, G., et al., "FuSnap: Fuzzy Control Of Logical Volume Snapshot Replication For Disk Arrays", in IEEE Transactions on Industrial Electronics, vol. 58, No. Sep. 2011, 10 pp.

Verma, A., et al., "SWEEPER: An Efficient Disaster Recovery Point Identification Mechanism", FAST'08: 6th USENIX Conference on File and Storage Technologies, Feb. 26-29, 2008, 16 pp.

Winnard, K., et al., "IBM z/OS DFSMShsm Primer", IBM Redbooks, Sep. 2015, 498 pp.

* cited by examiner

FIG. 3A

| TIMESTAMP | APPL. NAME | VOLUME SUB-RECORD V0 | | | |
|---|---|---|---|---|---|
| | | LOGICAL DESCRIPTOR | PHYSICAL DESCRIPTOR | | |
| TIME = T0 | A1 | VOLSER = APP001 | SERIAL # = SN1234567 | LSS = L00 | CAA = C00 |

| TIMESTAMP | APPL. NAME | VOLUME SUB-RECORD V0.1 | | | | VOLUME SUB-RECORD V1 | | | |
|---|---|---|---|---|---|---|---|---|---|
| | | LOGICAL DESCRIPTOR | PHYSICAL DESCRIPTOR | | | LOGICAL DESCRIPTOR | PHYSICAL DESCRIPTOR | | |
| TIME = T0.5 | A1 | VOLSER = APP001 | SERIAL # = SN1234567 | LSS = L00 | CAA = C00 | VOLSER = APP002 | SERIAL # = SN1234567 | LSS = L00 | CAA = C01 |

| TIMESTAMP | VOLUME SUB-RECORD V0.2 | | | |
|---|---|---|---|---|
| | LOGICAL DESCRIPTOR | PHYSICAL DESCRIPTOR | | |
| TIME = T3.4 | VOLSER = APP001 | SERIAL # = SN1234567 | LSS = L10 | CAA = C00 |

| TIMESTAMP | VOLUME SUB-RECORD V1.1 | | | |
|---|---|---|---|---|
| | LOGICAL DESCRIPTOR | PHYSICAL DESCRIPTOR | | |
| TIME = T3.8 | VOLSER = APP002 | SERIAL # = SN1234567 | LSS = L10 | CAA = C01 |

| TIMESTAMP | APPL. NAME | VOLUME SUB-RECORD V0.3 | | | | VOLUME SUB-RECORD V1.2 | | | |
|---|---|---|---|---|---|---|---|---|---|
| | | LOGICAL DESCRIPTOR | PHYSICAL DESCRIPTOR | | | LOGICAL DESCRIPTOR | PHYSICAL DESCRIPTOR | | |
| TIME = T4.0 | A1 | VOLSER = APP001 | SERIAL # = SN1234567 | LSS = L10 | CAA = C00 | VOLSER = APP002 | SERIAL # = SN1234567 | LSS = L10 | CAA = C01 |

FIG. 3F — 116f

| TIMESTAMP | VOLUME SUB-RECORD V1.3 | | | |
|---|---|---|---|---|
| | LOGICAL DESCRIPTOR | PHYSICAL DESCRIPTOR | | |
| TIME = T4.6 | VOLSER = APP002 | SERIAL # = SN1234567 | LSS = L00 | CAA = C01 |

FIG. 6 — 550

| TIMESTAMP | PHYSICAL DESCRIPTOR | | | IMAGE DATA |
|---|---|---|---|---|
| TIME = T3.5 | SERIAL # = SN1234567 | LSS = L10 | CAA = C00 | Image Copy 114a |
| | SERIAL # = SN1234567 | LSS = L00 | CAA = C01 | Image Copy 114b |
| | SERIAL # = SN1234567 | LSS = L10 | CAA = C01 | Image Copy 114c |

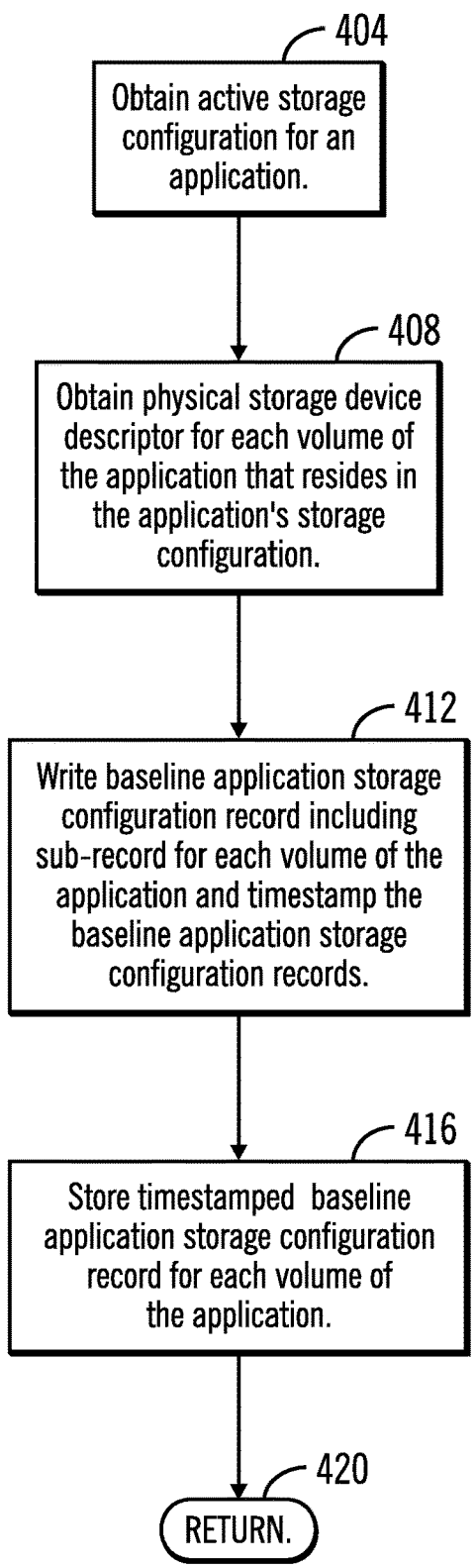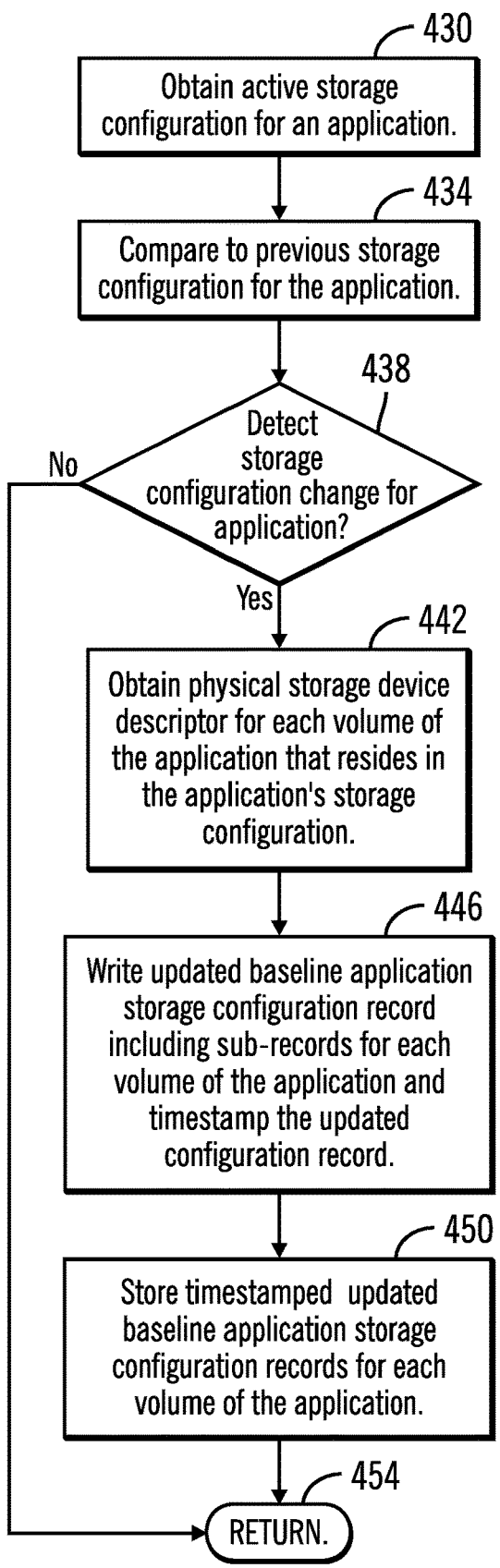
FIG. 4A
FIG. 4B

US 11,474,728 B2

DATA STORAGE VOLUME RECORD MANAGEMENT FOR APPLICATION-LEVEL RECOVERY

BACKGROUND

The present disclosure relates to a computer program product, system, and method for managing volume records for application-level recovery in a data storage system.

Large-scale, e.g., enterprise-level, storage media backups are frequently performed with a predetermined frequency to provide temporally-specific image copy backups of the data and metadata stored on an array of storage media for applications residing on a computer system. These enterprise-level storage backups of the entire inventory of data and metadata are typically created quickly, and in at least some instances, in less than one second. In one known system, the backup image copies are defined at the granularity of the storage media being imaged and allow for an enterprise-wide recovery from catastrophic events, e.g., natural disasters and ransomware attacks.

Business data residing on enterprise grade storage systems typically can be referenced using either logical or physical descriptors of the media within the storage system. For example, the storage controller and some applications often reference physical devices within the storage system, while the operating system and host-based applications frequently reference data using logical identifiers of the media. In an IBM DS8000 storage system, for example, a physical device in the system is uniquely physically identified using a physical storage device descriptor which includes a combination of controller serial number, Logical Subsystem number (LSS), and Channel Connection Address (CCA). However, an IBM Z host typically references media in the system logically, using a logical descriptor such as a volume serial number, or volser.

A volume is a logically defined area of storage and an application resident on a computing system may have one or more volumes assigned to it for storage of the data and metadata of the application. In most cases, the logical and physical identifiers have a one-to-one correspondence and are easily translated for hardware and software communications. For example, the IBM Z host utilizes a Unit Control Block (UCB) to associate the logical and physical volume identifiers.

An enterprise-level backup product, such as the IBM Geographically Dispersed Parallel Sysplex® (IBM GDPS®), captures large scale enterprise level backups and references the media backed up using physical descriptors such as physical device numbers. A separate recovery product, such as a z/OS Facility Storage Management Subsystem (DFSMS) product component such as DFSMShsm, can be used to surgically recover application data from the enterprise level backups created by the backup product. To do this, the recovery product records the media that a defined set of application data resides on over time. In one known system, the recovery product records in its inventory, logical identifiers of the media when capturing the backup data. When application data needs to be recovered to a previous point in time, the recovery product first determines the set of media that the application resided on at the time that the enterprise copy was captured. Next the recovery product invokes the backup product with the list of logical identifiers of the media to surgically recover from the enterprise level backup. In one known system the backup product translates the logical identifiers to their corresponding physical device numbers and can then perform the application recovery of the specified set of media.

SUMMARY

Provided are a computer program product, system and method for data storage record management for application-level recovery in accordance with the present description. In one embodiment, a first application storage configuration record is created for a first application resident in a enterprise computer system in which the enterprise computer system has a plurality of storage devices and the first application has a plurality of volumes residing on a portion of the plurality of storage devices. In one aspect, the first application storage configuration record includes for a first volume of the first application residing on a first storage device of the plurality of storage devices, a logical volume descriptor and a first physical storage device descriptor for the first storage device on which the first volume of the first application resides.

In one embodiment, movement of the first volume of the first application from the first storage device to a second storage device of the plurality of storage devices is detected. In response to detection of movement of the first volume of the first application from the first storage device to the second storage device of the plurality of storage devices, a volume storage configuration record is created in which the volume record includes for the first volume of the first application, the logical volume descriptor and a second physical storage device descriptor for the second storage device to which the first volume of the first application has moved.

In another aspect of the present disclosure, application recovery for the first application in association with a protection copy captured at a first point-in-time is initiated. A determination is made for each volume of the first application at the first point-in-time as a function of storage configuration records, the storage device at which each volume of the first application resided at the first point-in-time. In addition, a determination is made as a function of storage configuration records, whether a volume of the first application moved from one storage device to another storage device since the first point-in-time. In one embodiment, the application recovery for the first application may be interrupted in response to a determination that a volume of the first application has moved from one storage device to another storage device since the first point-in-time.

In yet another aspect of the present disclosure, in response to a determination that a volume of the first application has moved from one storage device to another storage device since the first point-in-time, the application recovery is completed for the first application after moving the volume which has moved back to the one storage device.

In still another aspect of the present disclosure in which the first application storage configuration record of the first application is a first baseline application storage configuration record of the first application, an updated baseline application storage configuration record of the first application is periodically created.

In another aspect of the present disclosure, determining whether a volume of the first application moved from one storage device to another storage device since the first point-in-time includes determining for each volume of the first application at the first point-in-time, the storage device at which each volume of the first application currently resides, and comparing for each volume each of the first application at the first point-in-time, a physical storage device descriptor of the storage device at which each volume of the first application currently resides to a physical storage device descriptor of the storage device at which each volume of the first application resided at the first point-in-time.

In still another aspect of the present disclosure, determining whether a volume of the first application moved from one storage device to another storage device since the first point-in-time further includes in response to the comparing for each volume each of the first application at the first point-in-time, the physical storage device descriptor of the storage device at which each volume of the first application currently resides to the physical storage device descriptor of the storage device at which each volume of the first application resided at the first point-in-time, detecting for a particular volume of the first application, a mismatch between the physical storage device descriptor of the storage device at which the particular volume of the first application currently resides and the physical storage device descriptor of the storage device at which the particular volume of the first application resided at the first point-in-time.

In yet another aspect of the present disclosure, application recovery is completed for the first application in response to a determination that no volume of the first application has moved from one storage device to another storage device since the first point-in-time.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

FIGS. 3A-3F illustrate various embodiments of storage configuration records and sub-records employing one aspect of data storage volume record management for application-level recovery in accordance with the present description.

FIGS. 4A-4D illustrate more detailed embodiments of operations of FIG. 2.

FIG. 6 illustrates an example of known image copies for application level recovery.

DETAILED DESCRIPTION

Figure 1:
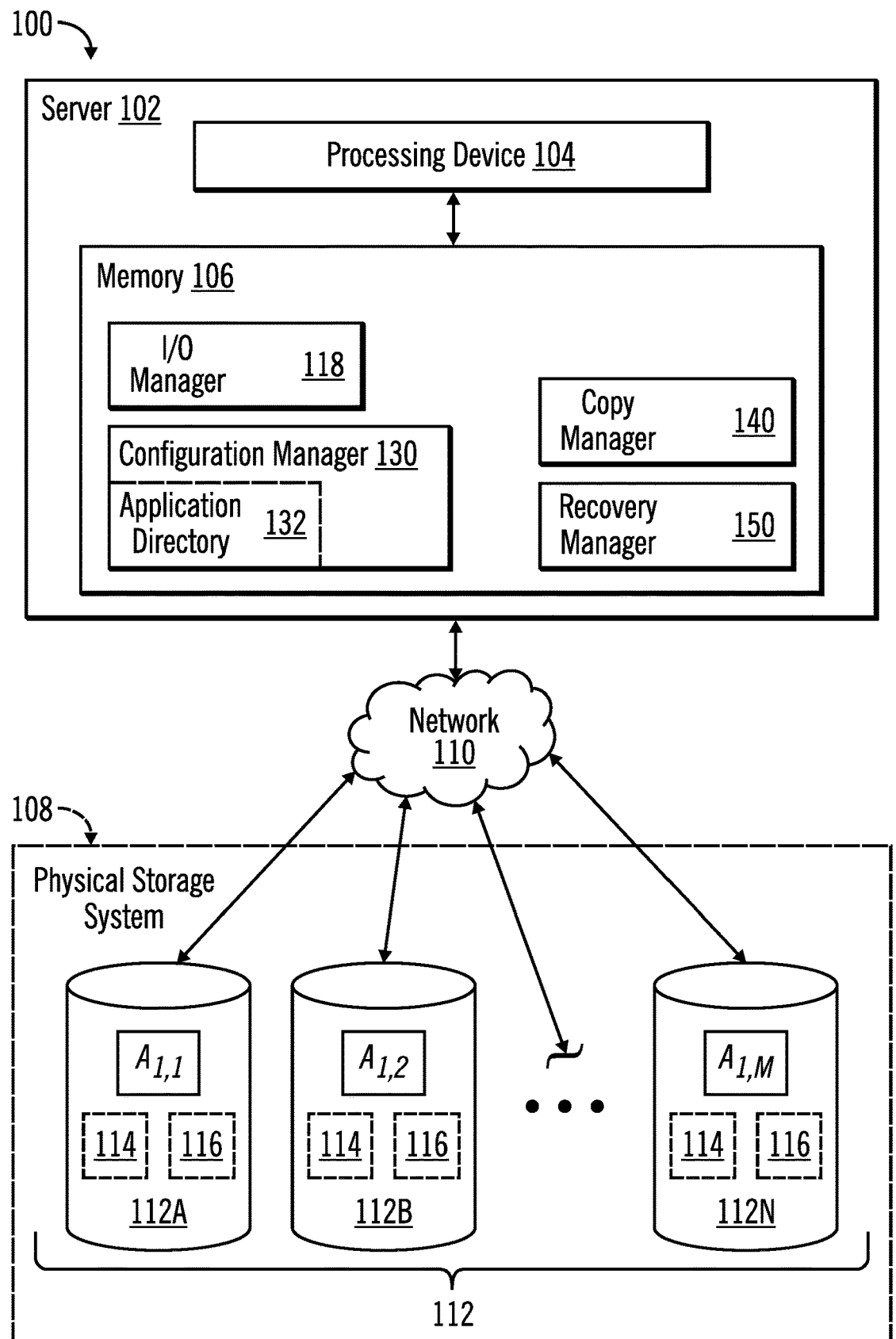
FIG. 1 illustrates an embodiment of a computing environment employing one aspect of data storage volume record management for application-level recovery in accordance with the present description.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Data storage volume recovery management in accordance with the present description provides a significant improvement to computer technology. For example, in a known computer system, logical identifiers of volumes to be recovered are translated to currently corresponding physical device numbers to perform application-level recovery using the specified set of media. However, it is appreciated herein that a volume and its corresponding data and metadata, which are identified by a logical volume identifier, can be moved from one physical device to another for various reasons such as volume growth and hardware upgrades. As such it is further appreciated herein that translation of the logical identifier to the wrong physical descriptor can cause data loss when attempting to recover the volume from a prior backup. For example, absent data storage volume record management for application-level recovery in accordance with the present description, the wrong set of data may be recovered if after the backup occurred, one or more logical volumes that once resided on the specified devices were moved to a different set of physical devices. In one known system, the recovery product is only aware of the physical devices upon which the logical volumes currently reside, and has no history of where the logical volumes previously resided.

In one aspect of data storage volume record management for application-level recovery in accordance with the present description, logical volume movement is addressed when performing enterprise application recovery. In one embodiment, a host-based recovery product in accordance with the present description, can detect logical volume movement from one physical device to another and proactively prevent or interrupt application level recovery that potentially may result in data loss.

As described in greater detail below, data storage volume record management for application-level recovery in accordance with the present description includes, in one embodiment, a time-based capturing of pairings of logical and physical volume identifiers or descriptors within storage configuration records and sub-records that are used to surgically recover volumes of an application from enterprise level protection copy of physical media. This history of pairings enables many types of logical volume to physical media remapping, such as the regular migration of data to replacement storage controllers, to occur at various times while reducing or eliminating loss of data due to such remappings.

In another aspect, data storage volume record management for application-level recovery in accordance with the present description, allows for an increased number of recovery points during procedures which may have an increased likelihood to an error leading to a need for application recovery. For example, when logical volumes are incrementally moved to new devices, the inventory may be incrementally updated with each new location of application data expressed in a logical and physical descriptor pairing. As a result, many points of data recovery can be available for use throughout the process of performing a hardware refresh. It is appreciated that the ability to successfully recover to many points in time throughout a hardware refresh process can provide significant value, due to the increased chances of an error occurring in the hardware refresh and a resultant need for application recovery.

In yet another aspect, a user can optionally pause inventory tracking for an application during data movement in, for example, a hardware refresh, to avoid excessive inventory updates. After data movement is complete, tracking may be resumed. It is appreciated that backups created by the backup product during such a pause to reduce inventory updates during a hardware refresh, may not be eligible for application recovery. Accordingly, when a large number of volumes will be moved to different devices during a pause of inventory updating, a new backup may be captured just prior to initiating data movement.

Referring to FIG. 1, a schematic diagram is provided illustrating a computing environment, i.e., an enterprise computer system 100 suitable for one or more aspects of data storage volume record management for application-level recovery in accordance with the present description. In one embodiment, the enterprise computer system 100 dynamically captures a history of environmental configuration changes related to movement of volumes of applications in logical and physical descriptor pairings, to facilitate application-level recoveries from enterprise-level image copy backups. The enterprise computer system 100 includes at least one server 102 (only one shown) that includes a processing device 104 operably coupled to a memory 106.

The program components in the memory 106, including 118, 132, 140, 150, are shown in FIG. 1 as program code loaded into the memory 106 and executed by the processor 104. Alternatively, some or all of the components functions may be implemented in hardware devices, such as in Application Specific Integrated Circuits (ASICs), Field Programmable Gate Array (FPGA) or executed by separate dedicated processors.

The memory 106 may comprise one or more memory devices volatile or non-volatile, such as a Dynamic Random Access Memory (DRAM), a phase change memory (PCM), Magnetoresistive random-access memory (MRAM), Spin Transfer Torque (STT)-MRAM, SRAM storage devices, DRAM, a ferroelectric random-access memory (FeTRAM), nanowire-based non-volatile memory, and Non-Volatile Direct In-Line Memory Modules (DIMMs), NAND storage, e.g., flash memory, Solid State Drive (SSD) storage, non-volatile RAM, etc.

The enterprise computer system 100 also includes a physical storage system 108 coupled to the server 102 through a network 110. The physical storage system 108, referred to hereinafter as the storage system 108, in at least one embodiment, includes storage media, e.g., a plurality N of storage devices 112, e.g., a first storage device 112A, a second storage device 112B, through a storage device 112N. Only three storage devices 112 are shown in FIG. 1, however, in other embodiments, the storage system 108 may include any number of storage devices 112 that enable operation of the enterprise computer system 100 as described herein.

The storage 108 may comprise different types or classes of storage devices 112, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Volumes in the storage 108 may further be configured from an array of devices, such as Just a Bunch of Disks (JBOD), Direct Access Storage Device (DASD), Redundant Array of Independent Disks (RAID) array, virtualization device, etc. Further, the storage 108 may comprise heterogeneous storage devices from different vendors and different types of storage devices, such as a first type of storage devices, e.g., hard disk drives, that have a slower data transfer rate than a second type of storage devices, e.g., SSDs.

The storage 108 may comprise a cloud storage system provided by a cloud storage service provider. Examples of cloud storage service providers include DropBox®, Google® Drive, Amazon Cloud Drive®, Amazon® S3, IBM® Cloud Object Storage System™, etc. (Dropbox is a registered trademark of Dropbox, Inc., Google is a registered trademark of Google, Inc., Amazon and Amazon Cloud Drive are trademarks of Amazon Technologies, Inc.; and IBM and Cloud Object Storage System are trademarks of IBM throughout the world).

The network 110 may include, without limitation, a Storage Area Network (SAN), Local Area Network (LAN), Intranet, the Internet, Wide Area Network (WAN), peer-to-peer network, wireless network, and arbitrated loop network. Accordingly, the enterprise computer system 100 includes a storage system 108 coupled to a server 102 through a network 110.

In one embodiment, the storage system 108 stores application data and metadata for every application resident on the enterprise computer system 100. In at least one embodiment, for one application, e.g., for a first application A1, a first portion $A_{1,1}$, of the data and metadata of A1 is resident on the first storage device 112A, a second portion $A_{1,2}$, of the data and metadata of the first application A1 is resident on the second storage device 112B, and an Mth portion $A_{1,M}$, of the data and metadata of the first application A1 is resident on the storage device 112N, where a value of M may, or may not, be equal to a value of N. Accordingly, in one embodiment, the storage devices 112A, 112B, and 112N house only the data and metadata associated with a single application, i.e., the first application A1, and therefore house no data associated with any other applications. Similarly, the storage devices between the second storage device 112B and the storage device 112N each house the data and metadata associated with a single application. Examples of enterprise-wide applications include, without limitation, payroll, warehouse, transportation, and batch jobs. Accordingly, the storage devices 112A through 112N include either full sets of application data and metadata for applications resident on a single storage device 112 or a portion of the data and metadata for applications spread across some combination of exclusive storage devices 112A through 112N.

In addition, at least one of the storage devices 112 store image copies 114 of the enterprise computer system 100 and physical storage configuration records 116. The image copies 114 and physical storage configuration records 116 are shown in phantom on the three illustrated storage devices 112A, 112B, and 112N to indicate that they will not reside on a storage device with application data thereon to preserve the application-only feature of the storage devices 112. The image copies 114 and physical storage configuration records 116 are described further herein.

The server 102 also includes a plurality of modules. Specifically, the server 102 includes an Input/Output ("I/O") manager 118 to manage read and write requests directed to the storage system 108. The server 102 further includes a configuration manager 130 to manage the physical storage system 108, i.e., to manage the boundaries of the data stored on the storage system 108 on an application-by-application basis. The configuration manager 130 includes an application directory 132 having a record for each application data and metadata set resident within the storage system 108. Accordingly, the configuration manager 130 controls the configuration of the storage system 108.

The server also includes a copy manager 140 to create image level copies 114, such as point-in-time copies, of the application data and metadata in the storage system 108. These large-scale, enterprise image copies 114 may be periodically created using known techniques by the copy manager 140, for the entire enterprise computer system 100, and may be created independently of any configuration changes.

Given one or more user-identified applications to recover and a user-specified recovery point, the creation times of the inventory of image copies 114 may be examined by a recovery manager 150 to locate the image copy with a timestamp that represents the closest backup time prior to the desired recovery point. In one embodiment, the copy manager 140 may include an enterprise-level backup product, such as the IBM Geographically Dispersed Parallel Sysplex® (IBM GDPS®), which captures large scale enterprise level backups and references the media backed up using physical device numbers. An enterprise-level backup product, such as the IBM Geographically Dispersed Parallel Sysplex® (IBM GDPS®), may be modified to employ one or more aspects of data storage volume record management for application-level recovery in accordance with the present description, depending upon the particular application.

In addition, the server 102 includes the recovery manager 150. The recovery manager 150 dynamically captures environmental configuration changes that are managed by the configuration manager 130, where the environmental configuration changes are related to applications such that application-level recoveries may be performed from enterprise-level image copy backups. In one aspect of data storage volume record management for application-level recovery in accordance with the present description, the environmental configuration changes dynamically captured by the recovery manager 150 include movements of a volume of an application from one storage device to another. Although described in connection with movement of volumes, it is appreciated that data storage record management for application-level recovery in accordance with the present description is applicable to movement of other units and subunits of storage such as pages, data sets, and other logical and physical storage area units.

In one embodiment, the recovery manager 150 may include a recovery product, such as a z/OS Facility Storage Management Subsystem hierarchical storage management (DFSMShsm) product which can be used to surgically recover application data from the enterprise level backups created by the backup product of the copy manager 140. An enterprise level recovery product, such as z/OS Facility Storage Management Subsystem hierarchical storage management (DFSMShsm) product, may be modified to employ one or more aspects of data storage volume record management for application-level recovery in accordance with the present description, depending upon the particular application.

Figure 2:
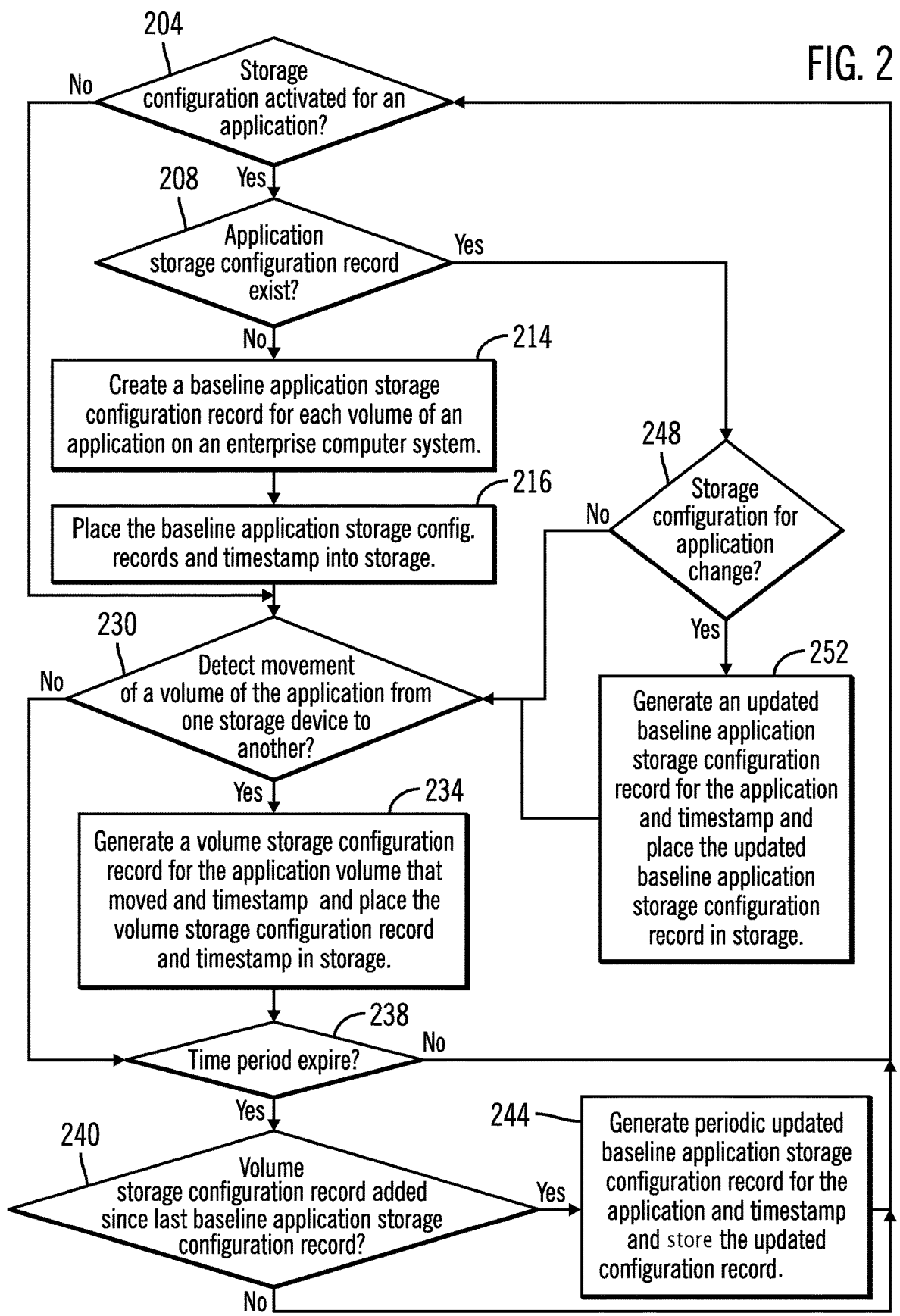
FIG. 2 illustrates an embodiment of operations for creating storage configuration records and sub-records employing one aspect of data storage volume record management for application-level recovery in accordance with the present description.

FIG. 2 depicts an example of operations of the recovery manager 150 which include creating and managing sets of storage configuration records 116 for each application in the enterprise computer system 100. These configuration records 116 include storage metadata for each application which defines the storage media, i.e., the storage devices 112 associated with each application. In addition, these configuration records 116 include storage metadata for each volume of each application which defines the storage media, i.e., the storage devices 112 associated with each application volume. FIGS. 3A-3F depict examples of storage configuration records 116a-116f, respectively, created by the recovery manager 150, and are discussed in greater detail below. In this embodiment, the recovery manager 150 is configured to perform the operations of FIG. 2 including blocks 204-252 and the accompanying description of FIG. 2. However, it is appreciated that other logic may be configured to perform the operations, depending upon the particular application.

In the example of FIG. 2, the recovery manager 150 creates the physical storage configuration records 116 in response to storage configuration change notifications issued by the configuration manager 130. For example, the recovery manager 150 may receive (block 204, FIG. 2) notification from the configuration manager 130 that a storage configuration has been activated for an application such as the application A1 of the enterprise computer system 100. A storage configuration for an application may be activated using known techniques. In one embodiment, storage configurations may be activated automatically through the configuration manager 130 and in other embodiments, the storage configurations may be activated manually through a suitable user interface of the configuration manager 130 or may be activated through a combination of automatic and manual operations. Upon activation of a storage configuration for an application, the configuration manager 130 notifies (block 204, FIG. 2) the recovery manager 150 of the activation.

In one embodiment, a determination is made as to whether (block 208, FIG. 2) a storage configuration record already exists for the storage configuration that has been activated. If no storage configuration record already exists for the storage configuration that has been activated, a baseline application storage configuration record is created (block 214) to include information for each volume of the application of the storage configuration activation, and time-stamped. The timestamped baseline application storage configuration record is stored (block 216, FIG. 2) as a storage configuration record 116 in the physical storage system 108.

Figure 4C:
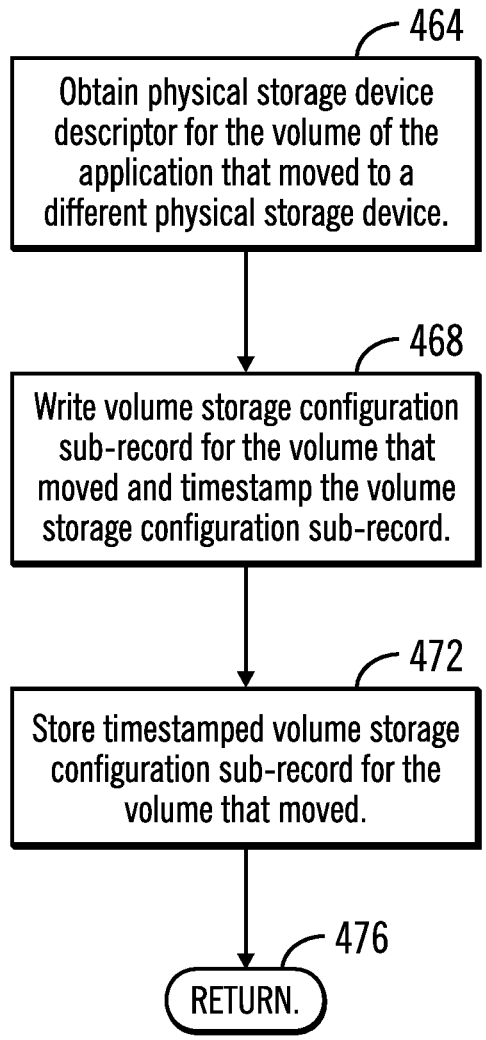

FIG. 4A depicts a more detailed example of the creation (block 214, FIG. 2) and storage (block 216, FIG. 2) of a baseline application storage configuration record. In this embodiment, the recovery manager 150 is configured to perform the operations of FIG. 4A (blocks 404-420), FIG. 4B (blocks 430-454), FIG. 4C (blocks 464-476) and FIG. 4D (blocks 484-496) and the accompanying descriptions of FIGS. 4A-4D. However, it is appreciated that other logic may be configured to perform the operations, depending upon the particular application.

In this example, in response to the storage configuration activation notification (block 204, FIG. 2) for application A1 from the configuration manager 130, the recovery manager 150 obtains (block 404, FIG. 4A) information describing the storage configuration, which was activated for application A1, in this example. In one embodiment, the details of the activated storage configuration may be included in the storage configuration activation notification received from the configuration manager 130. In other embodiments, the activated storage configuration details may be obtained separately. For example, the recovery manager 150 can query the configuration manager 130 for the baseline configuration information resident within the application directory 132. In addition, the timestamps associated with the creation operation of the baseline configuration records may be recorded by the recovery manager 150 through a query of the configuration manager 130. Accordingly, in one embodiment, the recovery manager 150 queries the configuration manager 130 to capture descriptors for each volume of the activated storage configuration.

In one aspect of data storage volume record management for application-level recovery in accordance with the present description, the recovery manager 150 obtains (block 408, FIG. 4A) not only the logical descriptor but also the physical device descriptor for each volume of the application for which the storage configuration was activated. In this example, the storage configuration, which was activated for application A1, has (for simplification of description purposes) a single volume, volser APP001 in this example, when the storage configuration is initially activated. In this example, the data for volume volser APP001 of application A1 is stored in storage having a physical device descriptor of serial number SN1234567, LSS L00 and CAA C000, which uniquely identifies the physical storage for the volume having logical volume descriptor volser APP001 of application A1. It is appreciated that physical descriptors may have other forms. For example, the number and type of physical descriptor components may vary, depending upon the particular application.

Having obtained (block 408, FIG. 4A) the physical device descriptor for the volume APP001 of the application A1, the recovery manager 150 writes (block 412, FIG. 4A) a baseline application storage configuration record which includes a sub-record for each volume of the application. FIG. 3A shows an example of a baseline application storage configuration record 116a for the storage configuration activated for application A1. As shown therein, the baseline application storage configuration record 116a has a field "Application name" which identifies the application to which the baseline application storage configuration record 116a is directed. The baseline application storage configuration record 116a further has fields for a volume sub-record V0 which include a "logical descriptor" field to identify the volume volser APP001 to which the volume sub-record V0 is directed. Paired with the logical descriptor of the volume APP001, are fields for the physical descriptor which identify the physical storage containing the data and metadata of the volume APP001 of the application A1.

In this embodiment, the physical descriptor fields include a controller "serial number" field to identify the controller serial number, which is SN1234567 in this example, an "LSS" field to identify the LSS which is L00 in this example, and a "CAA" field to identify the CAA which is C000 in this example. As previously noted, the storage configuration for the application A1 has a single volume (volser Appp001) when activated in this example for simplification purposes. However, it is appreciated that a storage configuration for application may have many volumes of the application when the storage configuration is activated. As such, the baseline application storage configuration record would have a volume sub-record for each such volume, identifying the volume by a pairing of a logical descriptor and a physical descriptor in a manner similar to that depicted in FIG. 4A.

As explained in greater detail below, by a pairing of a logical descriptor and a physical descriptor for each volume of a storage configuration record, detection of movement of a volume from one physical storage device to another may be more readily detected. As a result, loss of data caused by an attempt to recover data from the wrong physical storage device, may be reduced or eliminated. By comparison, in a known recovery product only logical descriptors of a volumes were captured in the inventory for applications residing on a computing system. As a result, movement of volumes from one physical storage device to another could go undetected, which could lead to loss of data in a misdirected data recovery attempt.

The baseline application storage configuration record 116a further has a "timestamp" field which identifies the time at which the storage configuration for application A1 was activated. In one embodiment, the time of activation of the activated storage configuration (represented as time T0 in this example) may be included in the storage configuration activation notification received from the configuration manager 130. In other embodiments, the activated storage configuration details may be obtained by the recovery manager 150 separately in a query, for example. The baseline application storage configuration record 116a is stored (block 416, FIG. 4A) in stored suitable storage such as that of the storage system 118.

Obtaining information, and creating and storing records are, in general, well understood computer operational techniques. These well known computer operational techniques may be modified as disclosed in the figures and accompanying description, and employed for data storage volume record management for application-level recovery in accordance with the present description after suitable modification.

Returning (block 420, FIG. 4A) to the determination as to whether (block 208, FIG. 2) a storage configuration record already exists for the storage configuration that has been activated, if a storage configuration record already exists for the application for which another storage configuration that has been activated, a determination is made as to whether (block 248, FIG. 2) there is a change in the storage configuration which was activated. If so, an updated baseline application storage configuration record is created (block 252) and timestamped for each volume of the application of the storage configuration activation, and the timestamped updated baseline application storage configuration record is stored (block 252, FIG. 2) as a storage configuration record 116 in the physical storage system 108.

FIG. 4B depicts a more detailed example of the storage configuration change detection (block 248, FIG. 2) and the creation (block 252, FIG. 2) of an updated baseline application storage configuration record. In this example, in response to the storage configuration activation notification (block 204, FIG. 2) for application A1 from the configuration manager 130, the recovery manager 150 obtains (block 430, FIG. 4B) data describing the storage configuration, which was activated for application A1, in this example. Such data may include for example, a logical descriptor of each volume of the activated storage configuration for application A1. As previously mentioned in connection with block 404 of FIG. 4A, details of the activated storage configuration may be included in the storage configuration activation notification received from the configuration manager 130. In other embodiments, the activated storage configuration details may be obtained separately such as in one or more queries, for example.

The storage configuration data obtained in block 430 for application A1 is compared (block 434, FIG. 4B) to the baseline application storage configuration record 116a (FIG. 3A) for application A1 and a determination is made (block

438, FIG. 4B) as to whether there is a change in the storage configuration for application A1. In this example, the storage configuration which was activated for application A1 has added another volume, volser APP002 in addition to the original single volume, volser APP001 when the storage configuration was initially activated for application A1. Since the baseline application storage configuration record 116a lacks a volume sub-record for the added volume, volser APP002, this change to the storage configuration for application A1 may be readily detected (block 438, FIG. 4B).

Having detected (block 438, FIG. 4B) a change in the activated storage configuration, in one aspect of data storage volume record management for application-level recovery in accordance with the present description, the recovery manager 150 again obtains (block 442, FIG. 4B) not only the logical descriptor but also the physical device descriptor for each volume of the application for which the storage configuration was activated. In this example, the physical descriptor for the volume volser APP001 remains unchanged from the prior storage configuration activation. However, the data for volume volser APP002 of application A1 is stored in storage having a physical device descriptor of serial number SN1234567, LSS L00 and CAA C001, which uniquely identifies the physical storage for the volume having logical descriptor volser APP002 of application A1.

Having obtained (block 442, FIG. 4B) the physical device descriptors for the volumes APP001 and APP002, respectively, of the application A1, the recovery manager 150 writes (block 446, FIG. 4B) an updated baseline application storage configuration record which includes a sub-record for each volume of the application. FIG. 3B shows an example of an updated baseline application storage configuration record 116b for the subsequent storage configuration activated for application A1. As shown therein, the updated baseline application storage configuration record 116b has in a manner similar to the baseline application storage configuration record 116a, a field "Application name" which identifies the application to which the updated baseline application storage configuration record 116b is directed.

The updated baseline application storage configuration record 116b further has fields for a volume sub-record V0.1 for volume volser APP001. However, the fields of volume sub-record V0.1 for volume volser APP001 remain unchanged from that depicted for volume sub-record V0 for volume volser APP001 in the initial baseline application storage configuration record 116a. However, the updated baseline application storage configuration record 116b further has fields for a volume sub-record V1 which include in a manner similar to that described above for volume sub-record V0, a "logical descriptor" field to identify the volume volser APP002 to which the volume sub-record V1 is directed. Paired with the logical descriptor of the volume volser APP002, are fields for the physical descriptor which identify the physical storage containing the data of the volume volser APP002 of the application A1.

In this embodiment, the physical descriptor fields include for the volume volser APP002, in a manner similar to that of the physical descriptor fields for the volume volser APP001, a controller "serial number" field to identify the controller serial number which is SN1234567 in this example, an "LSS" field to identify the LSS which is L00 in this example, and a "CAA" field to identify the CAA which is C001 in this example for the volume volser APP002. As previously noted, the subsequent activation of the storage configuration for the application A1 has just two volumes (volsers APP001 and APP002) when activated in this example for simplification purposes. However, it is appreciated that a subsequent activation of a storage configuration for an application may have many volumes of the application when the storage configuration is activated. As such, the updated baseline application storage configuration record would have a volume sub-record for each such volume, identifying the volume by a pairing of a logical descriptor and a physical descriptor in a manner similar to that depicted in FIG. 4B.

As explained in greater detail below, by a pairing of a logical descriptor and a physical descriptor for each volume of a storage configuration record, detection of movement of a volume from one physical storage device to another may be more readily detected. As a result, loss of data caused by an attempt to recover data from the wrong physical storage device, may be reduced or eliminated. The updated baseline application storage configuration record 116b further has a "timestamp" field which identifies the time at which this subsequent storage configuration for application A1 was activated. In one embodiment, the time of activation of the activated storage configuration (represented as time T0.5 in this example) may be included in the storage configuration activation notification received from the configuration manager 130. In other embodiments, the activated storage configuration details may be obtained by the recovery manager 150 separately in other queries. The updated baseline application storage configuration record 116b is stored (block 450, FIG. 4B) in suitable storage such as that of the storage system 108.

Returning (block 454, FIG. 4B) to the operations of FIG. 2, following creation and storage of a baseline or updated baseline application configuration record for an application as described above, a determination is made as to whether (block 230, FIG. 2) movement of a volume of the application from one storage device to another is detected. In the illustrated embodiment, the recovery manager 150 may receive notification from the configuration manager 130 that a volume of a storage configuration has moved from one storage device to another. In this manner, movement of a volume may be detected by the recovery manager 150. It is appreciated that volume movement may be detected using other techniques, depending upon the particular application.

A volume for an application such as the application A1 of the enterprise computer system 100 may be moved from one storage device to another using known techniques. In one embodiment, the volume may be moved automatically through the configuration manager 130 and in other embodiments, the volume may be moved manually through a suitable user interface of the configuration manager 130 or may be moved through a combination of automatic and manual operations.

In response to detection of movement of a volume, a volume storage configuration sub-record is created (block 234) and timestamped for each volume of the application for which movement to another storage device has been detected. Each such timestamped volume storage configuration sub-record is stored (block 234, FIG. 2) as a volume storage configuration sub-record of the records 116 in the physical storage system 108.

FIG. 4C depicts a more detailed example of the creation and storage (block 234, FIG. 2) of a timestamped volume storage configuration sub-record. In one aspect of data storage volume record management for application-level recovery in accordance with the present description, in response to the volume movement detection (block 230, FIG. 2) for application A1 from the configuration manager 130, the recovery manager 150 obtains (block 464, FIG. 4C) both the logical descriptor and also the physical device descriptor for each volume of the application for which movement was detected. In this example, the physical descriptor for the volume volser APP001 has changed from that indicted in the prior updated baseline application storage configuration activation. More specifically in this example, the volume volser APP001 has moved from the storage device at physical descriptor serial number SN1234567, LSS L00 and CAA C000, to a different storage device and hence has a different physical descriptor in this example, that is, serial number SN1234567, LSS L10 and CAA C00. Thus, having obtained (block 464, FIG. 4C) the new physical device descriptor for the volume APP001 of the application A1, the recovery manager 150 writes (block 468, FIG. 4C) a volume storage configuration sub-record for the volume volser APP001. FIG. 3C shows an example of a volume storage configuration sub-record 116c for the volume volser APP001 which moved for application A1. As used herein, the term "sub-record" also refers to a record which may or may not be a part of another record, depending upon the particular application.

In this embodiment, the volume storage configuration record 116c lacks a field "Application name" which identifies the application to which the updated baseline application storage configuration record 116c is directed. Instead, it may be determined that the volume that moved, that is, volume volser APP001 in this example, is a volume of application A1 by reading the prior updated baseline application storage configuration record 116b. However, it is appreciated that in other embodiments, a volume storage configuration sub-record may include a field such as "Application name", for example, which identifies the application to which the volume storage configuration sub-record 116b is directed.

In this embodiment, the volume storage configuration sub-record 116c does have fields for a volume sub-record V0.2, the contents of which have changed from that depicted for the volume volser APP001 in the volume sub-record V0.1 (FIG. 3B) of the updated baseline application storage configuration record 116b (FIG. 3B). More specifically in this example, the volume storage configuration record 116c has fields for the volume sub-record V0.2 which include in a manner similar to that described above for volume sub-record V0,1 a "logical descriptor" field to identify the volume volser APP001 to which the volume sub-record V0.2 is directed. Paired with the logical descriptor of the volume volser APP001, are fields for the physical descriptor which identify the changed physical storage which now contains the data and metadata of the volume volser APP001 of the application A1. In this embodiment, the physical descriptor fields include for the volume volser APP001, in a manner similar to that of the physical descriptor fields for the prior volume sub-record V0.1, a controller "serial number" field to identify the controller serial number which remains at SN1234567 in this example, an "LSS" field to identify the LSS which has changed to L10 in this example, and a "CAA" field to identify the CAA which remains at C000 in this example for the volume volser APP001 which moved.

In this example, a single volume of the application A1 is detected as having moved. However, it is appreciated that an application may have many volumes which move. As such, the storage configuration records 116 would have a volume sub-record similar to the volume sub-record 116c for each such volume, identifying the volume that moved by a pairing of a logical descriptor and a physical descriptor in a manner similar to that depicted in FIG. 4C.

As explained in greater detail below, by a pairing of a logical descriptor and a physical descriptor for each volume of a storage configuration record, detection of movement of a volume from one physical storage device to another prior to data recovery may be more readily detected. As a result, loss of data caused by an attempt to recover data from the wrong physical storage device, may be reduced or eliminated. The volume storage configuration sub-record 116c in this embodiment further has a "timestamp" field which identifies the time at which the volume volser APP001 was detected as having moved from one storage device to another. In one embodiment, the time of volume movement within the storage configuration (represented as time T3.4 in this example) may be included in the volume movement notification received from the configuration manager 130. In other embodiments, the time of volume movement may be obtained by the recovery manager 150 separately, such as in a separate query, for example. The timestamped volume storage configuration record 116c is stored (block 472, FIG. 4C) in suitable storage such as that of the storage system 118.

Returning (block 476, FIG. 4C) to the operations of FIG. 2, in this example, another volume, the volume volser APP002 of application A1, is detected (block 230, FIG. 2) as having moved at time T3.8 resulting in a timestamped volume sub-record V1.1 (116d, FIG. 3D) in a manner similar to that described above in connection with FIGS. 3C and 4C). As indicated in the timestamped volume sub-record 116d, the new physical descriptor for the changed physical storage device storing the data and metadata of the volume volser APP002 has physical descriptor parameter values Serial No. SN1234567, LSS L10, and CAA C01 in this example.

It is appreciated that over the lifecycle of an application such as application A1, for example, the application's associated data and metadata may expand and contract by the addition and deletion of volumes across the plurality of storage devices 112. In at least one embodiment, a similar generation of a baseline storage media configuration of the storage devices 112 is executed for applications newly installed on the enterprise computer system 100 after the initial baselines are created. Accordingly, each application on the enterprise computer system 100 has a generated baseline storage media configuration of storage devices 112 exclusively associated with that particular application. The baseline application storage configuration records are updated each time the storage configuration for that application changes by the addition or deletion of volumes as described above. Moreover, volume storage configuration sub-records are updated each time a volume moves from one physical storage device to another as described above.

Returning (block 476, FIG. 4C) to the operations of FIG. 2, a determination is also made as to whether (block 238, FIG. 2) a time period has expired. If so, it is further determined (block 240, FIG. 2) whether there have been in volume storage configuration records added for the application since the last baseline application configuration record was stored. In this example, volume storage configuration sub-records 116c and 116d have been added for application A1 since the last baseline application configuration record was stored, that is, since record 116b was stored as discussed above. Accordingly, a periodic updated baseline application storage configuration record is created (block 244) and timestamped for each volume of the application of the storage configuration for application A1. The timestamped periodic updated baseline application storage configuration record is stored (block 244, FIG. 2) as a storage configuration record 116 in the physical storage system 108.

Upon expiration of the next predetermined period of time, another periodic updated baseline application storage configuration record is created and stored if further volume storage configuration records have been added. The period of time that elapses between periodic record generation is, in one embodiment, every 15 minutes. In at least one embodiment, the waiting period is one day. In other embodiments, the waiting period is any value that enables operation of the enterprise computer system 100 as described herein. In addition, the waiting periods need not be consistent time periods, rather in at least one embodiment, the updated configuration records are generated as a function of other parameters and criteria, e.g., changes to the enterprise computer system 100 that are defined by predetermined parameters.

Figure 4D:
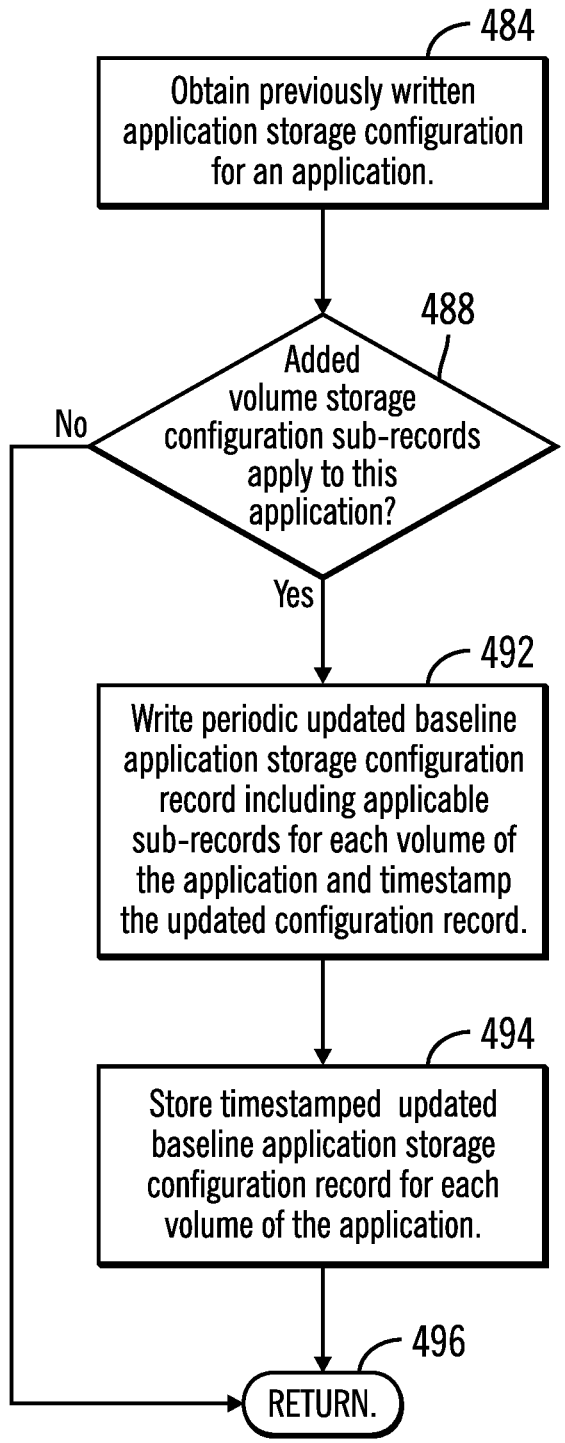

FIG. 4D depicts a more detailed example of the creation (block 244, FIG. 2) and storing of a periodic updated baseline application storage configuration record if volume storage configuration records have been added (block 240, FIG. 2). In this example, in response to expiration of the time period at a time T4, for example, and the addition of volume storage configuration records 116c, 116d since the last baseline record 116b, the recovery manager 150 obtains (block 484, FIG. 4D) the latest previously written baseline application storage configuration record for an application which is application A1, in this example. The updated baseline application storage configuration record 116b of FIG. 3B is timestamped at T0.5 and is the latest baseline application storage configuration record for the application A1 at time T4 in this example. The latest baseline application storage configuration record for the application A1 at time T4 may be determined by the recovery manager 150 inspecting the timestamp fields of each baseline application storage configuration record for the application A1 and determining that the timestamp T0.5 for the updated baseline application storage configuration record 116b of FIG. 3B is the latest baseline application storage configuration record for the application A1 as of the time T4 when the time period expired in this example. It is appreciated that the latest baseline application storage configuration record for the application A1 may be determined using other techniques such as sorting the baseline application storage configuration records for the application A1 by timestamp value before or after storing the baseline application storage configuration records for the application A1, for example.

Having obtained (block 484, FIG. 4D) the latest previously written baseline application storage configuration record (record 116b in this example) for an application (application A1, in this example), the recovery manager 150 determines whether (block 488, FIG. 4D) any of the volume sub-records created after time T0.5, the timestamp of the latest previously written baseline application storage configuration record (record 116b in this example) apply to the application, that is, application A1 of this example. In one embodiment, such a determination may be made by comparing the volume logical descriptor field for the volume volser of an added volume sub-record, to the volume logical descriptor field for the volume volser for each volume sub-record of the latest previously written baseline application storage configuration record (record 116b in this example). If the volume logical descriptor of an added volume sub-record matches a volume logical descriptor of a volume sub-record of the latest previously written baseline application storage configuration record (record 116b in this example), the added volume sub-record may be deemed (block 488, FIG. 4D) by the recovery manager 150 to be applicable to the application A1. In this example, the timestamped volume sub-record 116c (FIG. 3C) would be considered to be applicable to the application A1 because the volume logical descriptor of the timestamped volume sub-record V0.2 (116c, FIG. 3C), that is, volser APP001, matches the volume logical descriptor of the volume sub-record V0.1 of the latest previously written baseline application storage configuration record (record 116b in this example). Similarly, the timestamped volume sub-record V1.1 (116d, FIG. 3D) would be considered to be applicable to the application A1 because the volume logical descriptor of the timestamped volume sub-record 116d, that is, volser APP002, matches the volume logical descriptor of the volume sub-record V1 of the latest previously written baseline application storage configuration record (record 116b in this example).

It is appreciated that applicable volume sub-records for the application A1 may be determined using other techniques such as sorting the application storage configuration records and sub-records by application name such that all the storage configuration records for application A1 including volume sub-records may be grouped together and sorted by timestamp value before or after storing the configuration records and sub-records for the application A1, for example.

Having determined (block 488, FIG. 4D) that volume sub-records created after time T0.5, the timestamp of the latest previously written baseline application storage configuration record (record 116b in this example) apply to the application, that is, application A1 of this example.), the recovery manager 150 writes (block 492, FIG. 4D) a new periodic baseline storage configuration record for the application, using information from the volume sub-records determined (block 488, FIG. 4D) to be applicable to the application A1. FIG. 3E shows an example of a periodic updated baseline storage configuration record 116e for the application A1, using information from the latest previously written baseline application storage configuration record 116b (in this example) for the application A1 (in this example) and information from the volume sub-records 116c, 116d determined (block 488, FIG. 4D) to be applicable to the application A1. As shown therein, the periodic updated baseline application storage configuration record 116e has in a manner similar to the updated baseline application storage configuration record 116b, a field "Application name" which identifies the application to which the periodic updated baseline application storage configuration record 116e is directed.

As noted above, the data and metadata contents of the volume volser APP001 moved to a different physical storage device as indicated by the volume storage configuration sub-record V0.2 of timestamped volume sub-record 116c (FIG. 3C) discussed above. Accordingly the fields of the volume sub-record V0.3 for volume volser APP001 are updated to reflect this change in physical storage device. More specifically, the periodic updated baseline application storage configuration record 116e further has fields for the volume sub-record V0.3 which include a "logical descriptor" field to identify the volume volser APP001 to which the volume sub-record V0.3 is directed. Paired with the logical descriptor of the volume volser APP001, are fields for the physical descriptor which identify the physical storage which contains the data and metadata of the volume volser APP001 of the application A1 at time T3.4 as indicated by the timestamp of the timestamped volume sub-record V0.2 (116c, FIG. 3C). In this embodiment, the physical descriptor fields include for the volume volser APP001, in a manner similar to that of the physical descriptor fields of the volume sub-record V0.1 for the volume volser APP001, a controller "serial number" field to identify the controller serial number which is SN1234567 in this example, an "LSS" field to identify the LSS which is L10 in this example, and a "CAA" field to identify the CAA which is C00 in this example for the volume volser APP001.

In this example, the data and metadata contents of the volume volser APP002 also moved to a different physical storage device as indicated by the volume storage configuration sub-record V1.1 of timestamped volume sub-record 116d (FIG. 3D) discussed above. Accordingly the fields of the volume sub-record V1.2 for volume volser APP002 in timestamped periodic updated baseline application storage configuration record 116e are updated to reflect this change in physical storage device for volume volser APP002. In this example, the physical descriptor fields of the volume sub-record V1.2 for volume volser APP002 are updated so that the controller "serial number" field contents are SN1234567 in this example, the contents of the "LSS" field are L10 in this example, and the contents of the "CAA" are C01 in this example for the volume volser APP002.

As previously noted, the subsequent activation of the storage configuration for the application A1 has two volumes (volsers APP001 and APP002) when activated in this example for simplification purposes. However, it is appreciated that a subsequent activation of a storage configuration for an application may have many volumes of the application when the storage configuration is activated. As such, the periodic updated baseline application storage configuration record would have a volume sub-record for each such volume, identifying the volume by a pairing of a logical descriptor and a physical descriptor in a manner similar to that depicted in FIG. 3E.

As explained in greater detail below, by a pairing of a logical descriptor and a physical descriptor for each volume of a storage configuration record, detection of movement of a volume from one physical storage device to another may be more readily detected. As a result, loss of data caused by an attempt to recover data from the wrong physical storage device, may be reduced or eliminated. The periodic updated baseline application storage configuration record 116e further has a "timestamp" field which identifies the time at which the time period expired. In this example, the time period expired at time T4.0 Upon expiration of a time period, another time period is started to initiate creation of another periodic updated baseline application storage configuration record upon expiration of the subsequent time period. The timestamped periodic updated baseline application storage configuration record 116e is stored (block 494, FIG. 4D) in suitable storage such as that of the storage system 118. Following creation and storage of configuration records in response to a time period expiration, the recovery manager 150 returns (block 496, FIG. 4D) to await notification (blocks 204, 230, FIG. 2) of the next storage configuration activation, or volume movement, or expiration of another time period.

It is appreciated herein that the periodic updated baseline application storage configuration record effectively consolidates the volume sub-records previously created in response to volume movement since the last storage configuration activation. As a result, fewer storage configuration records need be maintained and read for data recovery management.

The formatting and fields of the storage configuration records and sub-records depicted in the figures are presented by way of example only. It is appreciated that other formats may be utilized including have different, additional or fewer fields, depending upon the particular application. Moreover, fields in records need not be physically contiguous but may be logically associated, for example.

Figure 5:
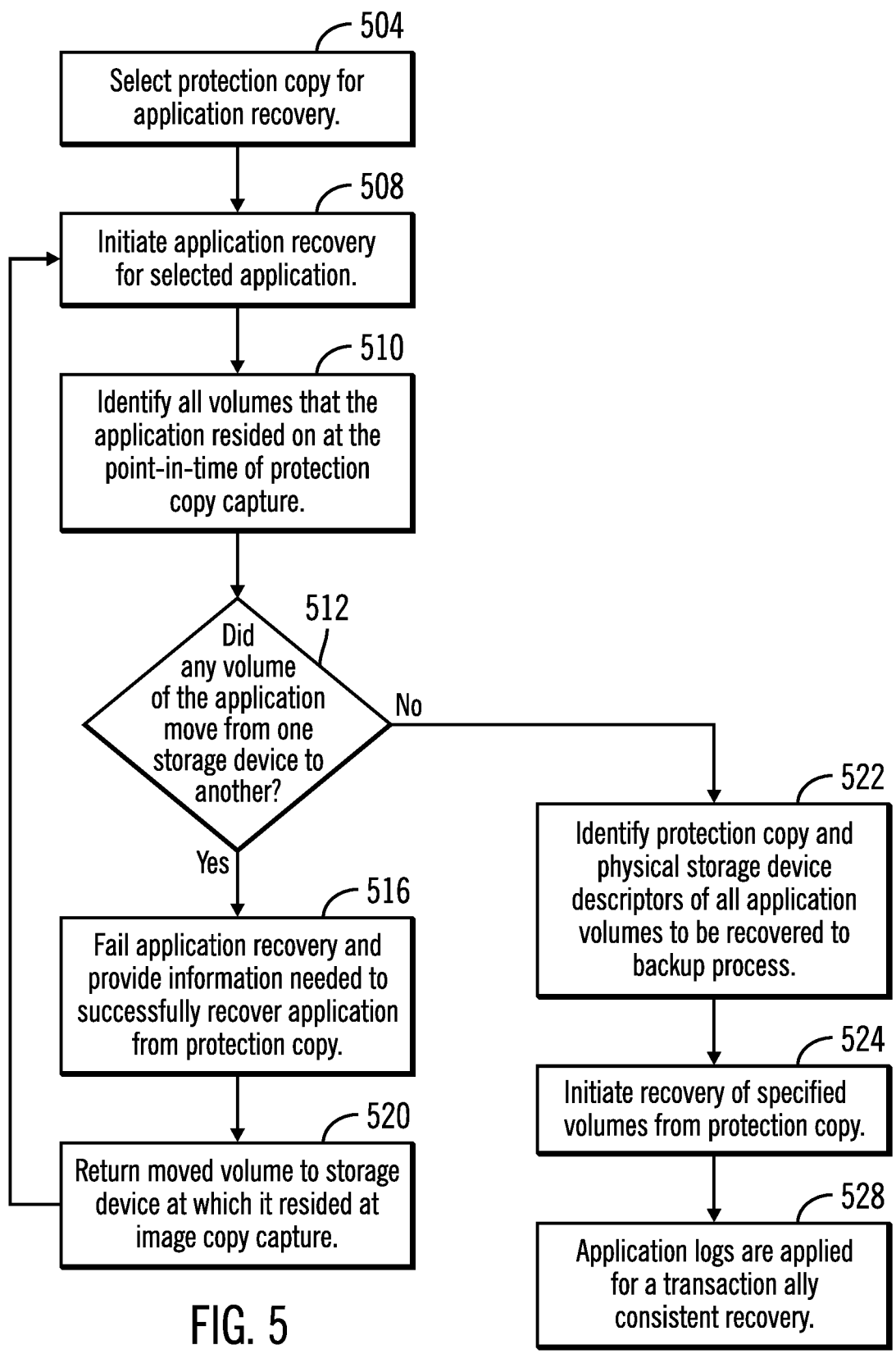
FIG. 5 illustrates an embodiment of operations for data recovery employing storage configuration records and sub-records in accordance with one aspect of the present description.

As previously mentioned, absent data storage volume record management for application-level recovery in accordance with the present description, a data recovery operation may attempt to recover the wrong set of data from a data backup, if after the backup occurred, the logical volumes that once resided on the specified devices were moved to a different set of physical devices. FIG. 5 is directed to operations of the recovery manager 150 to manage a data recovery operation for a particular application, application A1, in this example. In this embodiment, the recovery manager 150 is configured to perform the operations of FIG. 5 including blocks 504-528 and the accompanying description of FIG. 5. However, it is appreciated that other logic may be configured to perform the operations of FIG. 5, depending upon the particular application.

In one embodiment, a user selects (block 504, FIG. 5) a protection copy for recovery of an application such as the application A1, for example. In at least one embodiment, a user makes the determination of the application or applications to be recovered based on factors that include, without limitation, an unplanned failure of the application(s) due to a hardware failure, or a malicious corruption of the associated data In at least one embodiment, an artificial intelligence (AI) system coupled to the enterprise computer system 100 may determine a need to recover one or more applications based on predetermined criteria for recoveries, thereby automating the operation.

In this embodiment, the protection copies are image level copies 114 created by the copy manager 140 and are point-in-time copies of the application data and metadata in the storage system 108. These large-scale, enterprise image copies 114 are periodically created, by the copy manager 140, for the entire enterprise computer system 100, independently of any configuration changes. Upon expiration of another predetermined period of time, another image copy 114 is created by the copy manager 140. The period of time that elapses between image copy generation is, in one embodiment, every 15 minutes. In at least one embodiment, the waiting period is one day. In other embodiments, the waiting period is any value that enables operation of the enterprise computer system 100 as described herein. In addition, the waiting periods need not be consistent time periods, rather in at least one embodiment, the image copies are generated as a function of other parameters and criteria, e.g., changes to the enterprise computer system 100 that are defined by predetermined parameters. The next image copy and its associated timestamp are placed into storage by the recovery manager 150 as shown in FIG. 1. The image copies 114 may be created using known backup techniques or other suitable backup techniques which may be developed.

In one embodiment, a user may select an image copy by specifying a recovery point expressed as a particular point-in-time. In response, the recovery manager 150 examines the creation times of the inventory of image copies 114 to locate the image copy or copies with a timestamp that represents the closest backup time prior to the desired recovery point.

In this example, a user specifies a recovery point of time T3.6. In another embodiment, the recovery point may be established through a process including, without limitation, an A1. In this example, the recovery manager examines the inventory of image copies 114 and selects image copies which have an associated timestamp of time T3.5 as shown in the example of FIG. 6 for a record 550 of image copies 114a-114c created at time T3.5. In this example, the timestamp of time T3.5 associated with the image copies is the closest backup time prior to the recovery point T3.6 specified by the user.

In addition to specifying a recovery point, a user may also specify a particular application for recovery of the data and metadata of that application as of the specified recovery point. In this example, the user specifies application A1 for data and metadata recovery. The recovery manager 150 initiates (block 508, FIG. 5) application recovery for the specified application and identifies (block 510, FIG. 5) all the volumes in which the application resided at the time of point-in-time protection copy capture. In this example, the selected image copies were captured at a point-in-time of T3.5 as indicated in FIG. 6. In one embodiment, the volumes in which the application resided at the time of point-in-time protection copy capture time T3.5 may be identified by the recovery manager 150 examining the timestamps of the baseline application storage configuration records 116 and selecting the baseline application storage configuration record 116 having a timestamp that represents the closest configuration activation time (or periodic update expiration time) on or before the point-in-time protection copy capture time T3.5. In this example, the baseline application storage configuration record 116b (FIG. 3B) has a timestamp of T0.5 that represents the closest configuration activation time (or periodic update expiration time) on or before the point-in-time protection copy capture time T3.5. Having identified the baseline application storage configuration record 116b (FIG. 3B), the recovery manager may identify (block 510, FIG. 5) all the volumes in which the application A1 resided at T3.5, the time of point-in-time protection copy capture of the image copies 114a-114c of FIG. 6. In this example, the application A1 resided in two volumes, that is, volume volsers APP001 and APP002 at time T3.5 as indicated by the baseline application storage configuration record 116b (FIG. 3B) timestamped with time T0.5.

Having identified that the application A1 resided in the two volumes, volume volsers APP001 and APP002, at time T3.5 as indicated by the earlier baseline application storage configuration record 116b (FIG. 3B) timestamped with time T0.5, the recovery manager 150 determines (block 512, FIG. 5) whether any volume of the application A1 moved from one storage device to another since the point-in-time protection copy capture time T3.5. In one embodiment, the recovery manager 150 may determine whether any volume of the application A1 moved from one storage device to another since the point-in-time protection copy capture time T3.5, by comparing the current physical descriptor for each volume of the application A1 to the physical descriptor for each volume at the point-in-time protection copy capture time T3.5. In this example, the current time is at T4.1 such that the recovery for application A1 was requested at time T4.1.

In one embodiment, the physical descriptor for each volume at the point-in-time protection copy capture time may be determined by the recovery manager examining the storage configuration sub-records and records 116 on or before the capture point-in-time of the selected image copy and identifying for each volume of the application A1, the closest storage configuration sub-record or record 116 closest in time to the capture point-in-time of the selected image copy.

In this example, the recovery manager identifies the timestamped volume sub-record V0.2 (sub-record 116c, FIG. 3C) for the volume volser APP001 and the volume sub-record V1 of the timestamped updated baseline application storage configuration record 116b (FIG. 3B) as being prior to and closest in time to the capture point-in-time T3.5 of the selected image copies 550 (FIG. 6). From the timestamped volume sub-record V0.2 (sub-record 116c, FIG. 3C) the physical descriptor for the volume volser APP001 at the capture point-in-time T3.5 is determined to be Serial No. SN1234567, LSS L10 and CAA C00. From volume sub-record V1 of the time stamped updated baseline application storage configuration record 116b, the physical descriptor for the volume volser APP002 at the capture point-in-time T3.5 is determined to be Serial No. SN1234567, LSS L00 and CAA C01.

In one embodiment, the current physical descriptor for each volume of the application A1 at the current time of T4.1 may be determined by the recovery manager 150 examining the storage configuration records and sub-records 116 for the application A1 subsequent to the capture point-in-time T3.5 for the selected image copies 550 (FIG. 6) but on or before the current time of T4.1 in this example. The recovery manager 150 identifies for each volume of the application A1, the latest volume storage configuration sub-record prior to the current time T4.1. In this example in which the current time is T4.1, the periodic updated baseline application storage configuration record 116e which is timestamped with time T4.0 contains the latest and therefore the current storage configuration information for each volume of the Application A1 at time T4.1. In this example, there are no storage configuration records or volume sub-records timestamped after that of the periodic updated baseline application storage configuration record 116e which is timestamped with time T4.0, which are also on or before the current time T4.1 Accordingly, the recovery manager 150 determines that the periodic updated baseline application storage configuration record 116e identifies the current storage configuration for the application A1 at time T4.1 including the current physical descriptor for each volume of the application A1 residing in storage at the capture point-in-time T3.5 for the selected image copies 550 (FIG. 6). In this example, the current physical descriptor at time T4.1 for the volume volser APP001 is Serial No. SN1234567, LSS L10, CAA C00 as indicated by the volume sub-record V0.3, and the current physical descriptor for the volume volser APP002 is Serial No. SN1234567, LSS L10, CAA C01 as indicated by the volume sub-record V1.2 of the periodic updated baseline application storage configuration record 116e.

In an alternative embodiment, the recovery manager 150 can query the configuration manager 130 for the information associated with the most current configuration of the storage system 108 that is resident within the application directory. In such an embodiment, the recovery manager 150 can create a present physical storage media configuration record similar to the record 116e that is stored by the recovery manager 150.

By comparing the current physical descriptor for volume volser APP001 of the application A1 as identified by the volume sub-record V0.3 of the periodic updated baseline application storage configuration record 116e, to the physical descriptor of the volume volser APP001 as indicated by the timestamped volume sub-record V0.2 (sub-record 116c, FIG. 3C) at the point-in-time protection copy capture time T3.5, it may be determined that the volume volser APP001 did not move since the point-in-time protection copy capture time T3.5, because the physical descriptor for the volume volser APP001 is the same in both the volume storage configuration sub-records V0.2 (116c) and V0.3 of record 116e. Thus, the physical descriptors of the records match. In contrast, it may be determined that the volume volser APP002 did move since the point-in-time protection copy capture time T3.5, because the physical descriptor for the volume volser APP002 is different in the volume storage configuration sub-records V1 and V1.2 for the volume volser APP002. More specifically the physical descriptor parameter LSS changed from L00 at the point-in-time protection copy capture time T3.5, to L10 in the current physical descriptor for volume volser APP002. Thus, there is a mismatch in the physical descriptors.

The recovery manager 150 having determined (block 512, FIG. 5) that the volume volser APP002 did move from one storage device to another since the point-in-time protection copy capture time T3.5. the recovery manager 150 fails (block 516, FIG. 2) the data recovery operation for application A1 in one embodiment, to prevent potential data loss For example, in a known recovery product which utilizes a Unit Control Block (UCB) to associate the logical and physical volume identifiers, the volume volser APP002 would be translated in a data recovery attempt to its current associated physical descriptor which would be Serial No. SN1234567, LSS L10, CAA C01 since the LSS parameter changed from L00 to L01 when the data and metadata contents of the volume volser APP002 moved from one physical storage device to another as described above. As a result, absent storage volume record management for application-level recovery in accordance with the present description, a data backup product provided the current physical descriptor of Serial No. SN1234567, LSS L10, CAA C01 of the volume volser APP002, instead of the prior physical descriptor Serial No. SN1234567, LSS L00, CAA C01 at which the volume volser APP002 resided at the point-in-time protection copy capture time T3.5, would attempt to use the image copy 114c from the image copy record 550, to recovery the data and metadata for the volume volser APP002 since the physical descriptor associated with the image copy 114c matches the current physical descriptor for the volume volser APP002, leading to a potential loss of data. instead of the correct image copy 114b. In this example, the correct image copy to use for recovery of the volume volser APP002 is the image copy 114b since the physical descriptor associated with the image copy 114b matches the prior physical descriptor Serial No. SN1234567, LSS L00, CAA C01 at which the volume volser APP002 resided at the point-in-time protection copy capture time T3.5, In one embodiment, a failed recovery attempt may be reinstated by providing (block 516, FIG. 5) information needed to successfully recover the application from the protection copy. For example, the identify of the volume which moved, volume volser APP002 in this example, and the physical descriptor at which the volume volser APP002 resided at the point-in-time protection copy capture time T3.5, may be provided to the configuration manager 130 to permit the volume that moved, volume volser APP002 in this example, to be moved back (block 520, FIG. 5) to the storage device (physical descriptor Serial No. SN1234567, LSS L00, CAA C01) at which the volume volser APP002 resided at the point-in-time protection copy capture time T3.5. In one embodiment, the volume volser APP002 may be moved back manually through a suitable user interface to the configuration manager 130, or may be moved back automatically by the configuration manager 130 in response to being provided (block 516, FIG. 5) the identity of the volume which moved, volume volser APP002 in this example, and the physical descriptor at which the volume volser APP002 resided at the point-in-time protection copy capture time T3.5.

In one embodiment, upon successful movement of the volume volser APP002 back to the physical storage at which the volume volser APP002 resided at the point-in-time protection copy capture time T3.5, the volume movement would be detected (block 230, FIG. 2) by the recovery manager 150 in response to a volume movement notification from the configuration manager 130. Accordingly a new volume storage configuration sub-record V1.3 (sub-record 116f, FIG. 3F) may be created for the volume volser APP002 in a manner similar to that described above in connection with FIG. 4C. As shown in FIG. 3F, the physical descriptor paired with the logical descriptor volume volser APP002 has been updated to physical descriptor Serial No. SN1234567, LSS L00, CAA C01, to match the physical descriptor of the storage device at which the volume volser APP002 resided at the point-in-time protection copy capture time T3.5.

As a result, upon resuming or re-initiating (block 508, FIG. 5) a recovery for application A1 at a new current time such as T4.8, for example, the identified volumes, volume volsers APP001 and APP002, of application A1 will all be determined (block 512, FIG. 5) to not have moved, that is the all the volumes of application A1 will be determined to currently reside in the same physical storage devices as identified by their associated physical descriptor, as those volumes resided at the point-in-time protection copy capture time T3.5.

Having passed (block 512, FIG. 5) the volume movement test in which it is determined that all volumes of the application A1 at the point-in-time protection copy capture time T3.5, currently reside (at time T4.8) in the same storage devices in which they resided at the point-in-time protection copy capture time T3.5. the selected protection copy captured at time T3.5 and storage device physical descriptors for the volumes of the application A1 to be recovered (volume volsers APP001 and APP002 in this example) may be safely identified (block 522, FIG. 5) to a suitable backup product such as the copy manager 140. In response, the copy manager may initiate (block 524, FIG. 5) the recovery of the data and metadata from the correct image copies 114a and 114b (FIG. 6) for the volume volsers APP001 and APP002, respectively. In one embodiment, application logs for the application A1 may be applied (block 528, FIG. 5) for this transactionally consistent recovery.

Note that the physical descriptors in the inventory may not match the current physical descriptors of a volume due to a hyperswap in a replication environment. Therefore, in one embodiment, the recovery manager 150 searches all remote pairs when determining (block 512, FIG. 5) whether a logical volume has moved.

It is appreciated that storage configuration changes for an application may include adding or removing storage devices 112 from the system 100 after a backup image copy has been made. There are known techniques for accommodating such changes. For example, in one known technique, the existing configuration records of the current time are reconciled by the recovery manager 150 with the backup configuration records to determine (1) which, if any, storage devices 112 were added to the application since the backup was made and (2) which, if any, storage devices 112 were removed from the application since the backup copy was made. In one known process, storage devices 112 that were added will not be included in the recovery and will be initialized by the recovery manager 150 to return the storage devices 112 to the state that they existed at the time of the backup. Storage devices 112 that were removed from the application configuration will be returned to the application configuration by the recovery manager 150 to facilitate a successful recovery operation. Once the configuration has been returned to the state as it existed at the time of the backup by the recovery manager 150, the image recovery of all of the associated storage media is initiated and conducted by the recovery manager 150. Once the recovery completes, any forward recovery can additionally be started.

As previously mentioned, the image copies 114 may be created using known backup techniques or other suitable backup techniques which may be developed. In one embodiment, the backup image copies are defined at the granularity of the storage media that was available, or coupled to, the remainder of the enterprise computer system at the time of the backup. For example, all the data and metadata that represents the application may be defined with respect to the storage media that it resides on at the time of the image copy creation. In addition, all new allocations and extensions for the associated application may be within that defined set of storage media and this media in one embodiment, may not contain data or metadata from any other application. Defining the backup at this high-level granularity facilitates the relatively quick creating of the image copy. However, it is appreciated that image copies may be created at a greater or lesser granularity, depending upon the particular application. Similarly, it is appreciated that in other embodiments, applications may be interspersed within storage media.

It is seen from the above that in addition to prevention of data loss, data storage volume record management for application-level recovery in accordance with the present description, can provide for an increased number of recovery points during procedures which may have an increased likelihood to an error leading to a need for application recovery. However, in one embodiment, a user can optionally pause inventory tracking for an application during data movement in, for example, a hardware refresh, to avoid excessive inventory updates. After data movement is complete, tracking may be resumed. It is appreciated that backups created by the backup product during such a pause to reduce inventory updates during a hardware refresh, may not be eligible for application recovery. Accordingly, when a large number of volumes will be moved to different devices during a pause of inventory updating, a new backup may be captured just prior to initiating large scale data movement.

Figure 7:
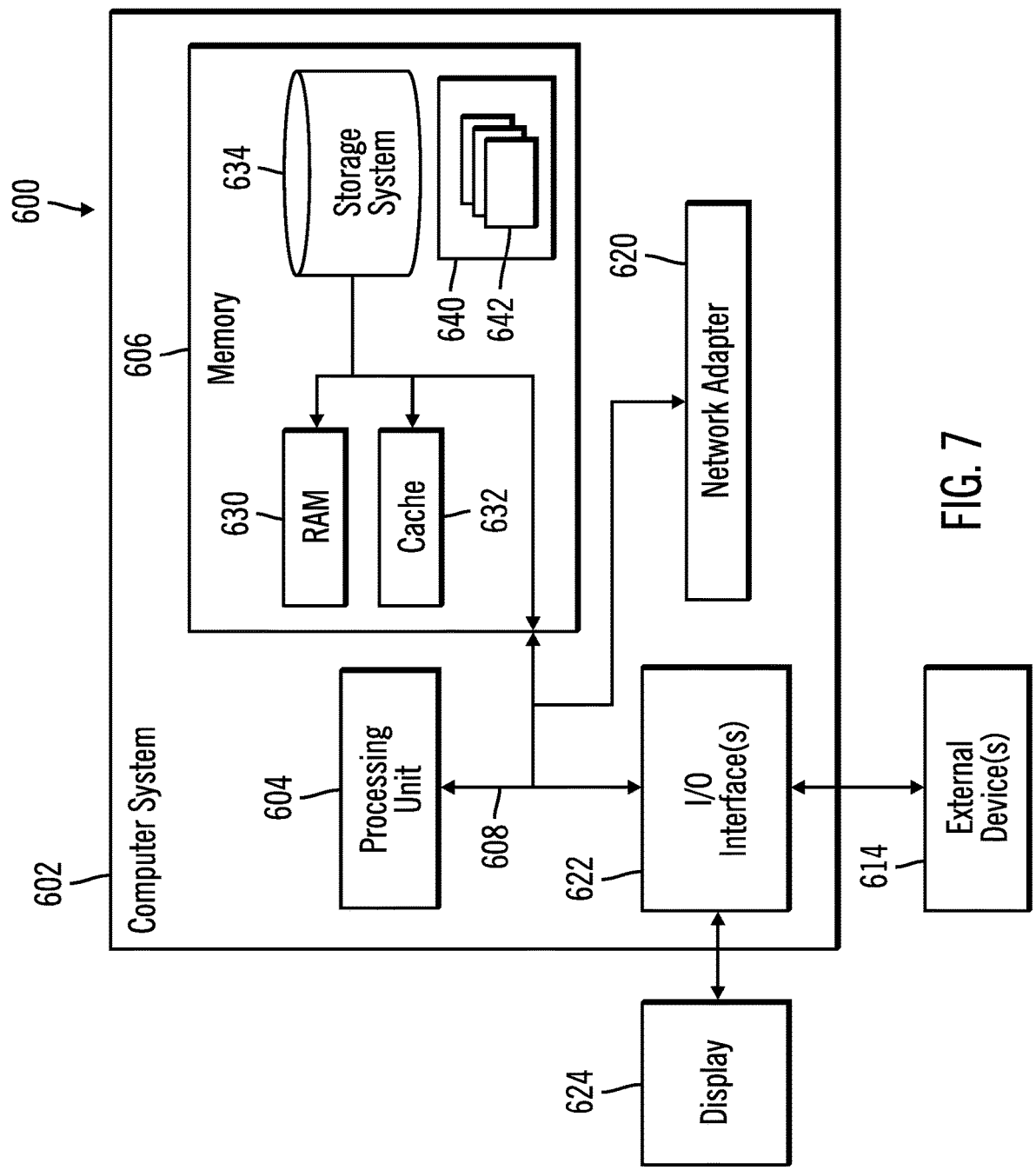
FIG. 7 illustrates a computing environment in which the components of the figures may be implemented.

Aspects of the recovery manager 150 and configuration manger 130 may be embodied in a computer system/server in a single location, or in at least one embodiment, may be configured in a cloud-based system sharing computing resources. With reference to FIG. 7, a block diagram is provided illustrating an example of a computer system 600 including a computer/server 602, hereinafter referred to as a host 602 in communication with a cloud based support system, to implement the system, tools, and processes described above with respect to FIGS. 1-5. Host 602 is operational with numerous other general purpose or special purpose computer system environments or configurations. Examples of well-known computer systems, environments, and/or configurations that may be suitable for use with host 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

The computational components of the figures may be implemented in one or more computer systems, such as the computer system or host 602 shown in FIG. 7. Host 602 may be described in the general context of computer system-executable instructions, such as program modules, being executed by a computer system. Generally, program modules may include routines, programs, objects, components, logic, data structures, and so on that perform particular tasks or implement particular abstract data types. Host 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, host 602 is shown in the form of a general-purpose computing device. The components of host 602 may include, but are not limited to, one or more processors or processing devices or units 604, e.g. hardware processors, a system memory 606, and a bus 608 that couples various system components including system memory 606 to processing device 604. Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host 602 typically includes a variety of computer system readable media. Such media may be any available media that is accessible by host 602 and it includes both volatile and non-volatile media, removable and non-removable media.

Memory 606 can include computer system readable media in the form of volatile memory, such as random access memory (RAM) 630 and/or cache memory 632. By way of example only, a storage system 634 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one program product having a set (e.g., at least one) of program modules that are configured to carry out the functions of embodiments of the invention.

Program/utility 640, having a set (at least one) of program modules 642, may be stored in memory 606 by way of example, and not limitation, as well as an operating system, one or more application programs, other program modules, and program data. Each of the operating systems, one or more application programs, other program modules, and program data or some combination thereof, may include an implementation of a networking environment. Program modules 642 generally carry out the functions and/or methodologies of embodiments to dynamically capture volume movement configuration changes related to applications such that application-level recoveries may be performed from enterprise-level image copy backups. For example, the set of program modules 642 may include the recovery manager 150, the copy manager 140, and the configuration manager 130 as described in FIGS. 1-5.

Host 602 may also communicate with one or more external devices 614, such as a keyboard, a pointing device, etc.; a display 624; one or more devices that enable a user to interact with host 602; and/or any devices (e.g., network card, modem, etc.) that enable host 602 to communicate with one or more other computing devices. Such communication can occur via Input/Output (I/O) interface(s) 622. Still yet, host 602 can communicate with one or more networks such as a local area network (LAN), a general wide area network (WAN), and/or a public network (e.g., the Internet) via network adapter 620. As depicted, network adapter 620 communicates with the other components of host 602 via bus 608. In at least one embodiment, a plurality of nodes of a distributed file system (not shown) is in communication with the host 602 via the I/O interface 622 or via the network adapter 620. It should be understood that although not shown, other hardware and/or software components could be used in conjunction with host 602. Examples, include, but are not limited to microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory 606, including RAM 630, cache memory 632, and storage system 634, such as a removable storage drive and a hard disk installed in a hard disk drive. Computer programs (also called computer control logic) are stored in memory 606. Computer programs may also be received via a communication interface, such as network adapter 620. Such computer programs, when run, enable the computer system to perform the features of the present embodiments as discussed herein. In particular, the computer programs, when run, enable the processing device 604 to perform the features of the computer system. As such, computer programs may represent controllers of the computer system. Accordingly, the functionality for the recovery manager 150, including the copy manager 140 and the configuration manager 130, as described in FIGS. 1-5, is embodied as computer program code stored in memory 606 (in some embodiments as program modules 642), where the computer program code includes the instructions to be executed by the processing device 604 to provide the functionality of the recovery manager 150 as described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (: NAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

Accordingly, the functionality for the recovery manager 150, including the copy manager 140 and the configuration manager 130, as described in FIGS. 1-5, may be embodied as computer readable program instructions to be executed by one or more hardware devices other than, or in addition to, the processing device 604 to provide the functionality of the recovery manager 150 as described herein.

In at least one embodiment, host 602 is a node of a cloud computing environment. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
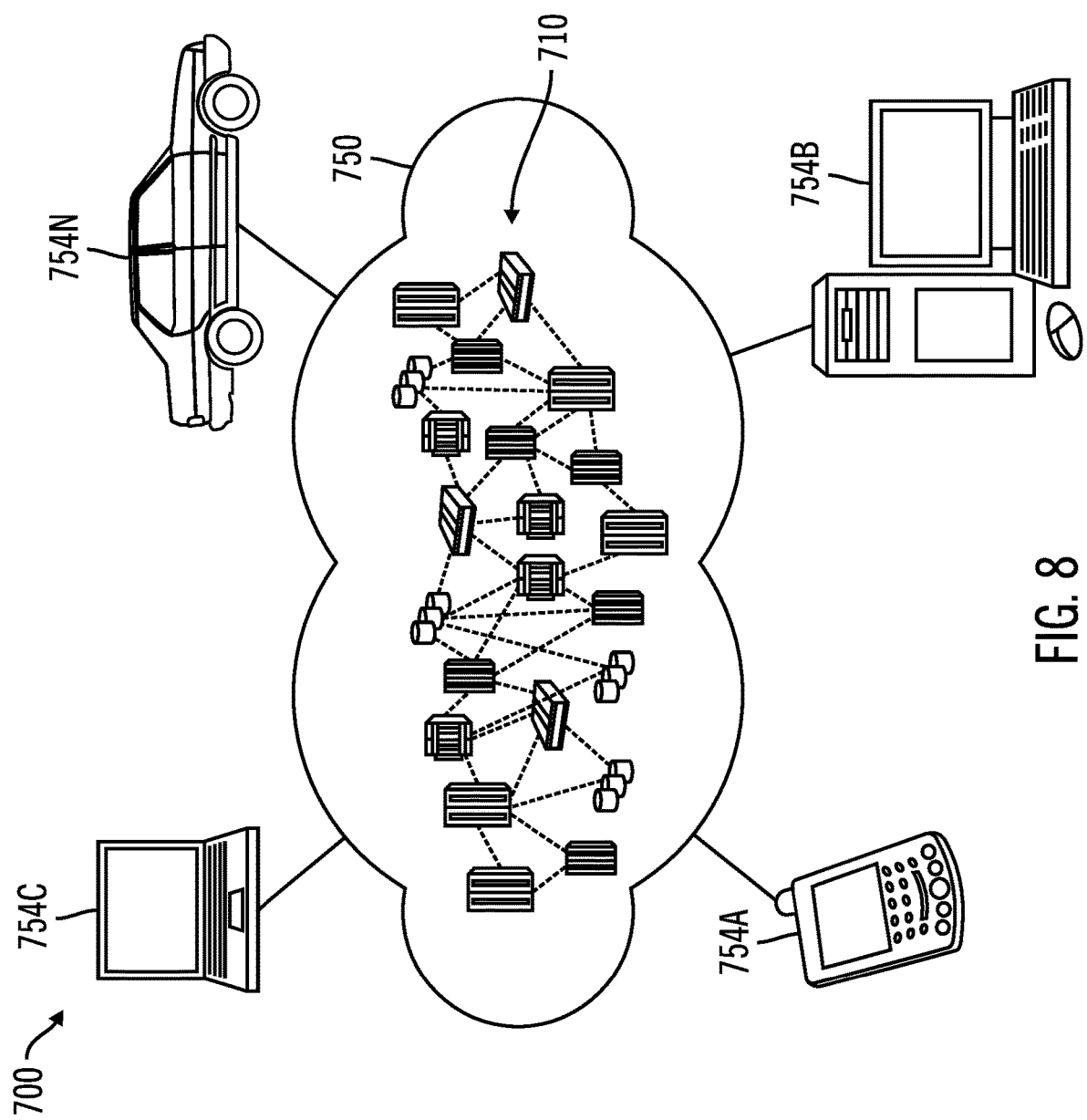
FIG. 8 is a schematic diagram illustrating a cloud computer environment, in accordance with some embodiments of the present disclosure.

Referring now to FIG. 8, a schematic diagram is provided illustrating an example cloud computing network 700. As shown, cloud computing network 700 includes a cloud computing environment 750 having one or more cloud computing nodes 710 with which local computing devices used by cloud consumers may communicate. Examples of these local computing devices include, but are not limited to, personal digital assistant (PDA) or cellular telephone 754A, desktop computer 754B, laptop computer 754C, and/or automobile computer system 754N. Individual nodes within nodes 710 may further communicate with one another. They may be grouped (not shown) physically or virtually, in one or more networks, such as Private, Community, Public, or Hybrid clouds as described hereinabove, or a combination thereof. This allows the cloud computing network 700 to offer infrastructure, platforms and/or software as services for which a cloud consumer does not need to maintain resources on a local computing device. It is understood that the types of computing devices 754A-N shown in FIG. 8 are intended to be illustrative only and that the cloud computing environment 750 can communicate with any type of computerized device over any type of network and/or network addressable connection (e.g., using a web browser).

Figure 9:
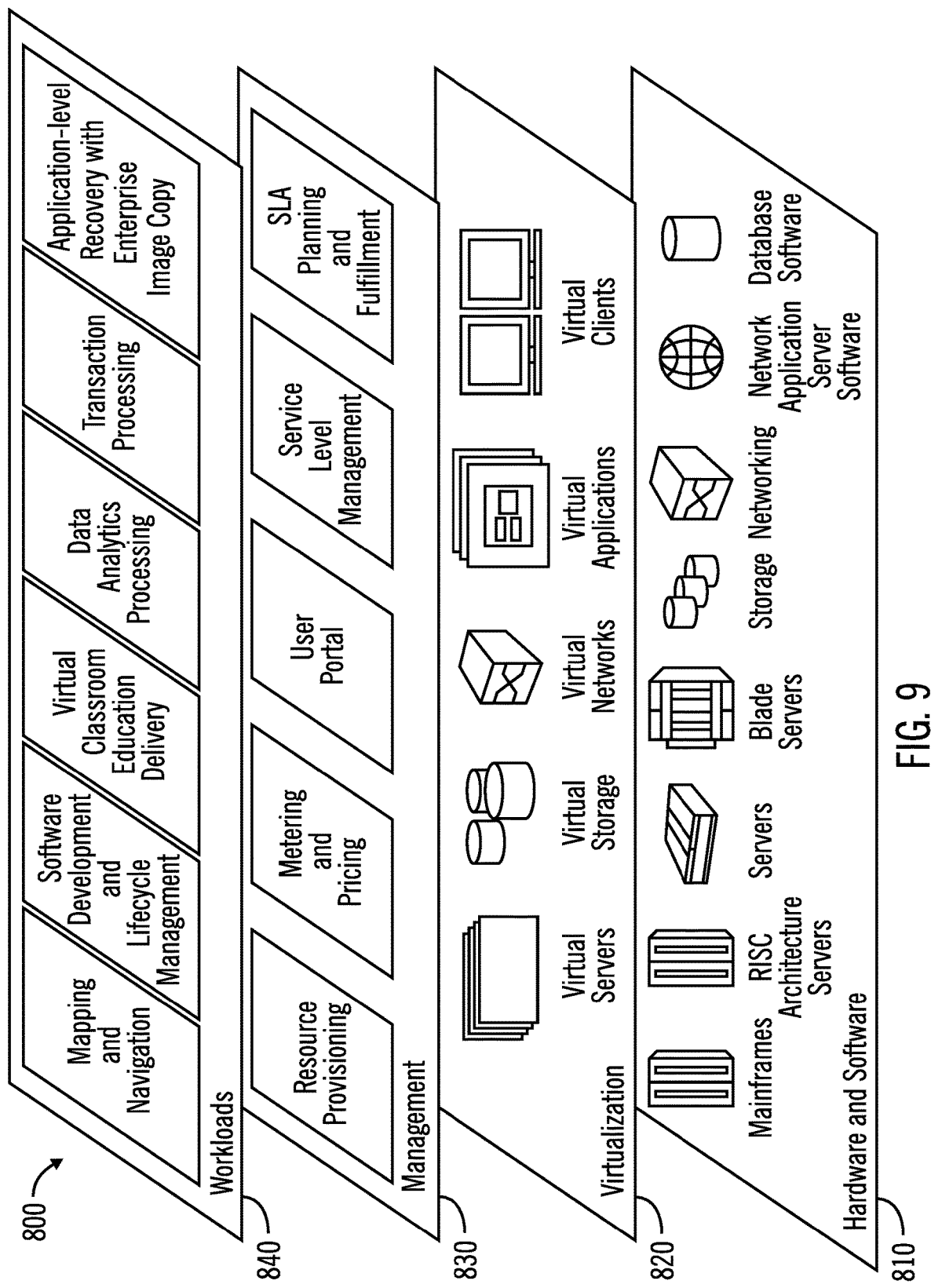
FIG. 9 is a block diagram illustrating a set of functional abstraction model layers provided by the cloud computing environment, in accordance with some embodiments of the present disclosure.

Referring now to FIG. 9, a set of functional abstraction layers 800 provided by the cloud computing network of FIG. 8 is shown. It should be understood in advance that the components, layers, and functions shown in FIG. 9 are intended to be illustrative only, and the embodiments are not limited thereto. As depicted, the following layers and corresponding functions are provided: hardware and software layer 810, virtualization layer 820, management layer 830, and workload layer 840.

The hardware and software layer 810 include hardware and software components. Examples of hardware components include mainframes; RISC (Reduced Instruction Set Computer) architecture-based servers; servers; blade servers; storage devices; networks and networking components. Examples of software components include network application server software, and database software.

Virtualization layer 820 provides an abstraction layer from which the following examples of virtual entities may be provided: virtual servers; virtual storage; virtual networks, including virtual private networks; virtual applications and operating systems; and virtual clients.

In one example, management layer 830 may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer 840 provides examples of functionality for which the cloud computing environment may be utilized. Examples of workloads and functions which may be provided from this layer include, but are not limited to mapping and navigation; software development and lifecycle management; virtual classroom education delivery; data analytics processing; transaction processing; and application-level recoveries performed with enterprise level image copies.

It will be appreciated that there is disclosed herein a system, method, apparatus, and computer program product for evaluating natural language input, detecting an interrogatory in a corresponding communication, and resolving the detected interrogatory with an answer and/or supporting content.

While particular embodiments of the present disclosure have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of a computer-based system or platform.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Accordingly, the scope of protection of the embodiments is limited only by the following claims and their equivalents.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for an application resident in a enterprise computer system wherein the enterprise computer system includes a plurality of storage devices, the application having a plurality of volumes residing on a portion of the plurality of storage devices, wherein the computer program product comprises a computer readable storage medium having program instructions executable by a processor to cause operations, the operations comprising:

creating a first application storage configuration record for a first application resident in the enterprise computer system wherein the enterprise computer system, the first application having a plurality of volumes residing on a portion of the plurality of storage devices and wherein the first application storage configuration record includes for a first volume of the first application residing on a first storage device of the plurality of storage devices, a logical volume descriptor and a first physical storage device descriptor for the first storage device on which the first volume of the first application resides;

detecting movement of the first volume of the first application from the first storage device to a second storage device of the plurality of storage devices;

in response to detection of movement of the first volume of the first application from the first storage device to the second storage device of the plurality of storage devices, creating a volume storage configuration record which includes for the first volume of the first application, the logical volume descriptor and a second physical storage device descriptor for the second storage device to which the first volume of the first application has moved; and determining in association with application recovery for the first application as a function of the storage configuration records, whether the first volume of the first application has moved from the first physical storage device to the second physical storage device.

2. The computer program product of claim 1 wherein the operations further comprise:

initiating application recovery for the first application in association with a protection copy captured at a first point-in-time;

determining for each volume of the first application at the first point-in-time as a function of storage configuration records the storage device at which each volume of the first application resided at the first point-in-time;

determining as a function of storage configuration records, whether a volume of the first application moved from one storage device to another storage device since the first point-in-time; and interrupting the application recovery for the first application in response to a determination that a volume of the first application has moved from one storage device to another storage device since the first point-in-time.

3. The computer program product of claim 2 wherein the operations further comprise in response to a determination that a volume of the first application has moved from one storage device to another storage device since the first point-in-time, moving the volume which has moved back to the one storage device and completing the application recovery for the first application after moving the volume which has moved back to the one storage device.

4. The computer program product of claim 2 wherein the first application storage configuration record of the first application is a first baseline application storage configuration record of the first application, the operations further comprising periodically creating an updated baseline application storage configuration record of the first application.

5. The computer program product of claim 2 wherein determining whether a volume of the first application moved from one storage device to another storage device since the first point-in-time includes:

determining for each volume of the first application at the first point-in-time, the storage device at which each volume of the first application currently resides; and comparing for each volume each of the first application at the first point-in-time, a physical storage device descriptor of the storage device at which each volume of the first application currently resides to a physical storage device descriptor of the storage device at which each volume of the first application resided at the first point-in-time.

6. The computer program product of claim 5 wherein determining whether a volume of the first application moved from one storage device to another storage device since the first point-in-time further includes:

in response to the comparing for each volume each of the first application at the first point-in-time, the physical storage device descriptor of the storage device at which each volume of the first application currently resides to the physical storage device descriptor of the storage device at which each volume of the first application resided at the first point-in-time, detecting for a particular volume of the first application, a mismatch between the physical storage device descriptor of the storage device at which the particular volume of the first application currently resides and the physical storage device descriptor of the storage device at which the particular volume of the first application resided at the first point-in-time.

7. The computer program product of claim 2 wherein the operations further comprise completing the application recovery for the first application in response to a determination that no volume of the first application has moved from one storage device to another storage device since the first point-in-time.

8. A system, comprising:

an enterprise computer system which includes a processor, a plurality of storage devices and an application having a plurality of volumes residing on a portion of the plurality of storage devices, and a computer program product which includes a computer readable storage medium having program instructions that when executed by the processor cause operations, the operations comprising:

creating a first application storage configuration record for a first application resident in the enterprise computer system, the first application having a plurality of volumes residing on a portion of the plurality of storage devices and wherein the first application storage configuration record includes for a first volume of the first application residing on a first storage device of the plurality of storage devices, a logical volume descriptor and a first physical storage device descriptor for the first storage device on which the first volume of the first application resides;

detecting movement of the first volume of the first application from the first storage device to a second storage device of the plurality of storage devices;

in response to detection of movement of the first volume of the first application from the first storage device to the second storage device of the plurality of storage devices, creating a volume storage configuration record which includes for the first volume of the first application, the logical volume descriptor and a second physical storage device descriptor for the second storage device to which the first volume of the first application has moved; and determining in association with application recovery for the first application as a function of the storage configuration records, whether the first volume of the first application has moved from the first physical storage device to the second physical storage device.

9. The system of claim 8 wherein the operations further comprise:

initiating application recovery for the first application in association with a protection copy captured at a first point-in-time;

determining for each volume of the first application at the first point-in-time as a function of storage configuration records the storage device at which each volume of the first application resided at the first point-in-time;

determining as a function of storage configuration records, whether a volume of the first application moved from one storage device to another storage device since the first point-in-time; and interrupting the application recovery for the first application in response to a determination that a volume of the first application has moved from one storage device to another storage device since the first point-in-time.

10. The system of claim 9 wherein the operations further comprise in response to a determination that a volume of the first application has moved from one storage device to another storage device since the first point-in-time, moving the volume which has moved back to the one storage device and completing the application recovery for the first application after moving the volume which has moved back to the one storage device.

11. The system of claim 9 wherein the first application storage configuration record of the first application is a first baseline application storage configuration record of the first application, the operations further comprising periodically creating an updated baseline application storage configuration record of the first application.

12. The system of claim 9 wherein determining whether a volume of the first application moved from one storage device to another storage device since the first point-in-time includes:

determining for each volume of the first application at the first point-in-time, the storage device at which each volume of the first application currently resides; and comparing for each volume each of the first application at the first point-in-time, a physical storage device descriptor of the storage device at which each volume of the first application currently resides to a physical storage device descriptor of the storage device at which each volume of the first application resided at the first point-in-time.

13. The system of claim 12 wherein determining whether a volume of the first application moved from one storage device to another storage device since the first point-in-time further includes:

in response to the comparing for each volume each of the first application at the first point-in-time, the physical storage device descriptor of the storage device at which each volume of the first application currently resides to the physical storage device descriptor of the storage device at which each volume of the first application resided at the first point-in-time, detecting for a particular volume of the first application, a mismatch between the physical storage device descriptor of the storage device at which the particular volume of the first application currently resides and the physical storage device descriptor of the storage device at which the particular volume of the first application resided at the first point-in-time.

14. The system of claim 9 wherein the operations further comprise completing the application recovery for the first application in response to a determination that no volume of the first application has moved from one storage device to another storage device since the first point-in- time.

15. A computer-implemented method comprising:
creating a first application storage configuration record for a first application resident in a enterprise computer system wherein the enterprise computer system includes a plurality of storage devices, the first application having a plurality of volumes residing on a portion of the plurality of storage devices and wherein the first application storage configuration record includes for a first volume of the first application residing on a first storage device of the plurality of storage devices, a logical volume descriptor and a first physical storage device descriptor for the first storage device on which the first volume of the first application resides;
detecting movement of the first volume of the first application from the first storage device to a second storage device of the plurality of storage devices;
in response to detection of movement of the first volume of the first application from the first storage device to the second storage device of the plurality of storage devices, creating a volume storage configuration record which includes for the first volume of the first application, the logical volume descriptor and a second physical storage device descriptor for the second storage device to which the first volume of the first application has moved; and
determining in association with application recovery for the first application as a function of the storage configuration records, whether the first volume of the first application has moved from the first physical storage device to the second physical storage device.

16. The method of claim 15 further comprising:
initiating application recovery for the first application in association with a protection copy captured at a first point-in-time;
determining for each volume of the first application at the first point-in-time as a function of storage configuration records the storage device at which each volume of the first application resided at the first point-in-time;
determining as a function of storage configuration records, whether a volume of the first application moved from one storage device to another storage device since the first point-in-time; and
interrupting the application recovery for the first application in response to a determination that a volume of the first application has moved from one storage device to another storage device since the first point-in-time.

17. The method of claim 16 further comprising in response to a determination that a volume of the first application has moved from one storage device to another storage device since the first point-in-time, moving the volume which has moved back to the one storage device and completing the application recovery for the first application after moving the volume which has moved back to the one storage device.

18. The method of claim 16 wherein the first application storage configuration record of the first application is a first baseline application storage configuration record of the first application, the method further comprising periodically creating an updated baseline application storage configuration record of the first application.

19. The method of claim 16 wherein determining whether a volume of the first application moved from one storage device to another storage device since the first point-in-time includes:
determining for each volume of the first application at the first point-in-time, the storage device at which each volume of the first application currently resides; and
comparing for each volume each of the first application at the first point-in-time, a physical storage device descriptor of the storage device at which each volume of the first application currently resides to a physical storage device descriptor of the storage device at which each volume of the first application resided at the first point-in-time.

20. The method of claim 19 wherein determining whether a volume of the first application moved from one storage device to another storage device since the first point-in-time further includes:
in response to the comparing for each volume each of the first application at the first point-in-time, the physical storage device descriptor of the storage device at which each volume of the first application currently resides to the physical storage device descriptor of the storage device at which each volume of the first application resided at the first point-in-time, detecting for a particular volume of the first application, a mismatch between the physical storage device descriptor of the storage device at which the particular volume of the first application currently resides and the physical storage device descriptor of the storage device at which the particular volume of the first application resided at the first point-in-time.

21. The method of claim 16 further comprising completing the application recovery for the first application in response to a determination that no volume of the first application has moved from one storage device to another storage device since the first point-in-time.

* * * * *